(12) United States Patent
Floeder et al.

(10) Patent No.: US 11,327,454 B2
(45) Date of Patent: May 10, 2022

(54) SYNCHRONIZING MULTIPLE PROCESSING SYSTEMS

(71) Applicant: 3M INNOVATIVE PROPERTIES COMPANY, St. Paul, MN (US)

(72) Inventors: Steven P. Floeder, Shoreview, MN (US); Kenneth G. Brittain, Cottage Grove, MN (US); Joseph R. Nesbitt, Sioux Falls, SD (US)

(73) Assignee: 3M Innovative Properties Company, St. Paul, MN (US)

( * ) Notice: Subject to any disclaimer, the term of this patent is extended or adjusted under 35 U.S.C. 154(b) by 493 days.

(21) Appl. No.: 16/337,105

(22) PCT Filed: Sep. 27, 2017

(86) PCT No.: PCT/US2017/053785
§ 371 (c)(1),
(2) Date: Mar. 27, 2019

(87) PCT Pub. No.: WO2018/064202
PCT Pub. Date: Apr. 5, 2018

(65) Prior Publication Data
US 2019/0219979 A1 Jul. 18, 2019

Related U.S. Application Data

(60) Provisional application No. 62/402,297, filed on Sep. 30, 2016.

(51) Int. Cl.
*G05B 19/04* (2006.01)
*G05B 19/042* (2006.01)
(Continued)

(52) U.S. Cl.
CPC ....... *G05B 19/0423* (2013.01); *G05B 19/042* (2013.01); *G05B 19/4183* (2013.01);
(Continued)

(58) Field of Classification Search
CPC .................. G05B 19/0423; G05B 19/4183
(Continued)

(56) References Cited

U.S. PATENT DOCUMENTS 4,776,466 A 10/1988 Yoshida
5,375,722 A * 12/1994 Leary .................... B31B 50/042
209/578

(Continued)

FOREIGN PATENT DOCUMENTS

CN 101002229 A 7/2007
CN 101116280 A 1/2008
(Continued)

OTHER PUBLICATIONS

Goldblatt, "FIFOs Serve as Suitable Parallel Delay Elements—Synchronous Memories Offer Precise Digital Control", Electronic Design, May 1995, vol. 43, No. 10, 4 pages.

(Continued)

*Primary Examiner* — Hien D Khuu

(57) ABSTRACT

Systems and methods are directed to a device comprising a product status synchronization device. Examples of the product status synchronization device comprise a plurality of input ports and an encoder input, each of the input ports coupled to one of a plurality of registers and configured to receive a signal indicative of a status assigned to a product by one of a plurality of process stations, and to register the status assigned to the product into the one of the plurality of registers coupled to the input port, wherein one or more of the plurality of process stations are located at different distances from a predetermined location along a processing line and are configured to asynchronously process one or more products moving through the processing line.

12 Claims, 8 Drawing Sheets

(51) Int. Cl.
*G05B 19/418* (2006.01)
*G06F 9/30* (2018.01)

(52) U.S. Cl.
CPC ...... *G06F 9/30029* (2013.01); *G06F 9/30127* (2013.01); *G06F 9/30134* (2013.01)

(58) Field of Classification Search
USPC .......................................................... 700/108
See application file for complete search history.

(56) References Cited

U.S. PATENT DOCUMENTS

| | | | |
|---|---|---|---|
| 5,526,050 | A | 6/1996 | King |
| 5,555,504 | A * | 9/1996 | Lepper ............. G05B 19/41875 700/201 |
| 6,119,939 | A | 9/2000 | Schwartz et al. |
| 6,123,263 | A | 9/2000 | Feng |
| 6,807,232 | B2 | 10/2004 | Nicholson |
| 6,876,898 | B1 * | 4/2005 | Hranica ............. G05B 19/4183 700/95 |
| 7,606,950 | B2 | 10/2009 | Breyer |
| 7,813,638 | B2 | 10/2010 | Watkins |
| 8,204,951 | B2 | 6/2012 | Kornerup |
| 8,249,296 | B2 | 8/2012 | Silver |
| 9,096,405 | B2 | 8/2015 | Nakano |
| 2005/0101250 | A1 | 5/2005 | Helal et al. |
| 2006/0293784 | A1 | 12/2006 | Braunstein |
| 2011/0224918 | A1 * | 9/2011 | Floeder ................... D06H 3/08 702/35 |
| 2013/0300814 | A1 * | 11/2013 | Yohn ................... G06K 15/128 347/225 |

FOREIGN PATENT DOCUMENTS

| | | |
|---|---|---|
| CN | 102201089 A | 9/2011 |
| CN | 102226876 A | 10/2011 |
| CN | 202210289 U | 5/2012 |
| CN | 202662025 U | 1/2013 |
| CN | 103337038 A | 10/2013 |
| CN | 103777593 A | 5/2014 |
| CN | 104104494 A | 10/2014 |
| CN | 105518552 A | 4/2016 |
| CN | 205210903 U | 5/2016 |
| CN | 105730950 A | 7/2016 |
| CN | 205642628 U | 10/2016 |
| JP | 9089805 A2 | 4/1997 |
| JP | 2005-344245 | 12/2005 |
| JP | 2008149380 A | 7/2008 |
| TW | 200915816 A | 4/2009 |
| TW | 201610667 A | 3/2016 |
| WO | WO 0127577 A2 | 4/2001 |

OTHER PUBLICATIONS

International Search Report for PCT International Application No. PCT/US2017/053785, dated Dec. 11, 2017, 4 pages.

* cited by examiner

SYNCHRONIZING MULTIPLE PROCESSING SYSTEMS

TECHNICAL FIELD

The disclosure relates to tracking parts or product through multi-point inspection processes.

BACKGROUND

Systems for processing manufactured goods that contain multiple process stations, including stations that process the goods, stations that inspect the goods, or stations that both process and inspect the goods, need to correlate the processed information from each location to particular products and/or to positions of the goods as they move through the processing line or lines to provide a complete picture of the quality of the goods at one or more intermediate phases of processing or with respect to the end products. Often, processing lines will include multi-point inspection systems that include, for example, one or more machine vision systems at each point of inspection. In some systems, each machine vision system is configured to capture an image of the product or product being inspected, determine if the part or product has a specific flaw, and issue a signal indicating whether the part or product passed its inspection. Some machine vision systems include one or more sensors used to capture an image of a product to be inspected, and inspection software and a processor that executes the inspection software. Some machine vision systems include smart cameras, self-contained camera systems that are programmed to perform a specific task, and that can be modified, if needed, independently of the other inspection devices.

Often, other inspection systems operate in conjunction with the machine vision systems to detect faults other than the visible faults. Each device in the multi-point inspection system may operate independently of the other devices such that parts or products are inspected at multiple positions along an overall manufacturing process. Moreover, the inspection systems may operate asynchronously with respect to each other so as to independently produce respective inspection results. As such, it is important to track where each part or product is in the manufacturing process, and to track a status or statuses determined for each part or product by each of the inspection systems along the processing line so as to correlate the status or statuses determined for particular parts or products at some point in the processing line.

SUMMARY

In general, this disclosure describes a product status synchronization device that is configured to track and temporally synchronize (i.e., align) status data associated with product moving through a manufacture processing line based on signals received from processing and/or inspection stations (i.e., process stations) deployed within the processing line. The signals received at the product status synchronization device from the process stations are indicative of a status or statuses associated with each of the one or more products, as determined by process stations, at respective positions along the processing line. The product status synchronization device is configured to track the statuses assigned to each product by the process stations, temporally align the statuses conveyed by the signals, and to deliver a control signal at appropriate times to a downstream station (e.g., a reject station) for final disposition of the products.

In this way, a product status synchronization device (e.g., appliance) is described that may readily be deployed in manufacturing environments for synchronizing and combining outputs from multiple, asynchronous manufacturing process systems. For example, the product status synchronization device may be used to combine output signals from multiple machine vision systems or other inspection systems spaced at arbitrary positions on a manufacturing line. The device synchronizes and combines the individual decision outputs from each system to form a single final output, such as pass or reject final status, for any given product under inspection, and drives the output at the correct time to control any downstream reject station. The product status synchronization device provides a simple yet elegant, low cost device for deployment in any manufacturing environment. Furthermore, the product status synchronization device provides a user interface and other semi-automated mechanisms for easily configuring the temporal alignment of the signals, as well as the output control signal delivered to the reject station, based on the physical distance each of the process stations are located relative to some predetermined location along the processing line.

As one example, the disclosure is directed to a device comprising: a product status synchronization device comprising a plurality of input ports and an encoder input, each of the input ports coupled to one of a plurality of registers and configured to receive a signal indicative of a status assigned to a product by one of a plurality of process stations, and to register the status assigned to the product into the one of the plurality of registers coupled to the input port, wherein one or more of the plurality of process stations are located at different distances from a predetermined location along a processing line and are configured to asynchronously process one or more products moving through the processing line, wherein each of the plurality of registers is coupled to a different one of the plurality of input ports and having a register length, wherein the register length for each register is configured to have a length corresponding to a distance between the one of the plurality of process stations that is configured to be coupled to the input port coupled to the register and the predetermined location along the processing line, each register configured to track a plurality of statuses that have been registered into the register by the input port coupled to the register, and wherein the encoder input is configured to receive a movement signal indicative of movement of the one or more products through the processing line, and to shift the plurality of statuses registered in each of the plurality of registers based on the movement signal.

As another example, the disclosure is directed to a method comprising: assigning a separate register of a plurality of registers provided within a product tracking status circuit to a given and different one of a plurality of process stations provided at different positions along a processing line; moving a calibration product through the processing line, and generating a product present signal at each process station when the calibration product arrives at that process station; receiving, at the product status synchronization device, each of the product present signals indicating that the calibration product has arrived at each of the process stations; tracking, at the product status synchronization device, a number of encoder pulses associated with moving the calibration product from each of the plurality of process stations to a predetermined location along the processing line; for each of the separate registers, setting a register length for the separate register based on the number of encoder pulses associated with tracking the moving of the calibration product from the process station assigned to the separate register to the predetermined location.

As an additional example, the disclosure is directed to a method comprising: assigning a separate register of a plurality of registers provided within a product tracking status circuit to a given and different one of a plurality of process stations provided at different positions along a processing line; moving a calibration product through the processing line, and generating a product present signal at each process station when the calibration product arrives at that process station; receiving, at the product status synchronization device, each of the product present signals indicating that the calibration product has arrived at each of the process stations; tracking, at the product status synchronization device, a number of encoder pulses associated with moving the calibration product from each of the plurality of process stations to a predetermined location along the processing line; for each of the separate registers, setting a register length for the separate register based on the number of encoder pulses associated with tracking the moving of the calibration product from the process station assigned to the separate register to the predetermined location.

As an additional example, the disclosure is directed to a system comprising a processing line having a plurality of process stations positioned at one or more different locations along a processing line, the processing line configured to move one or more products through the processing line and to provide processing of the one more products at the plurality of process stations, each station configured to provide an output signal indicative of a status assigned to a product of the one or more products processed by that process station; and a product status synchronization device comprising a plurality of input ports and an encoder input, each of the input ports coupled to one of the plurality of process stations and to one of a plurality of registers, and configured to receive a signal indicative of the status assigned to a product process by the process station coupled to that input port, and to register the status assigned to the product into the registers coupled to the input port, wherein each of the plurality of process stations are located at different distances from a predetermined location along the processing line and are configured to asynchronously process one or more products moving through the processing line, wherein each of the plurality of registers is coupled to a different one of the plurality of input ports and having a register length, wherein the register length for each register is configured to have a bit length corresponding to a distance between the one of the plurality of process stations that is coupled to the input port coupled to that register and the predetermined location along the processing line, each register configured to track a plurality of statuses that have been registered into the register by the input port coupled to the register, and wherein the encoder input is configured to receive a movement signal indicative of movement of the one or more products through the processing line, and to shift the plurality of statuses stored in each of the plurality of registers based on the movement signal.

BRIEF DESCRIPTION OF DRAWINGS

The details of one or more examples of this disclosure are set forth in the accompanying drawings and the description below. Other features, objects, and advantages of this disclosure will be apparent from the description and drawings, and from the claims.

The drawings and the description provided herein illustrate and describe various examples of the inventive methods, devices, and systems of the present disclosure. However, the methods, devices, and systems of the present disclosure are not limited to the specific examples as illustrated and described herein, and other examples and variations of the methods, devices, and systems of the present disclosure, as would be understood by one of ordinary skill in the art, are contemplated as being within the scope of the present application.

DETAILED DESCRIPTION OF ILLUSTRATIVE EMBODIMENTS

Figure 1:
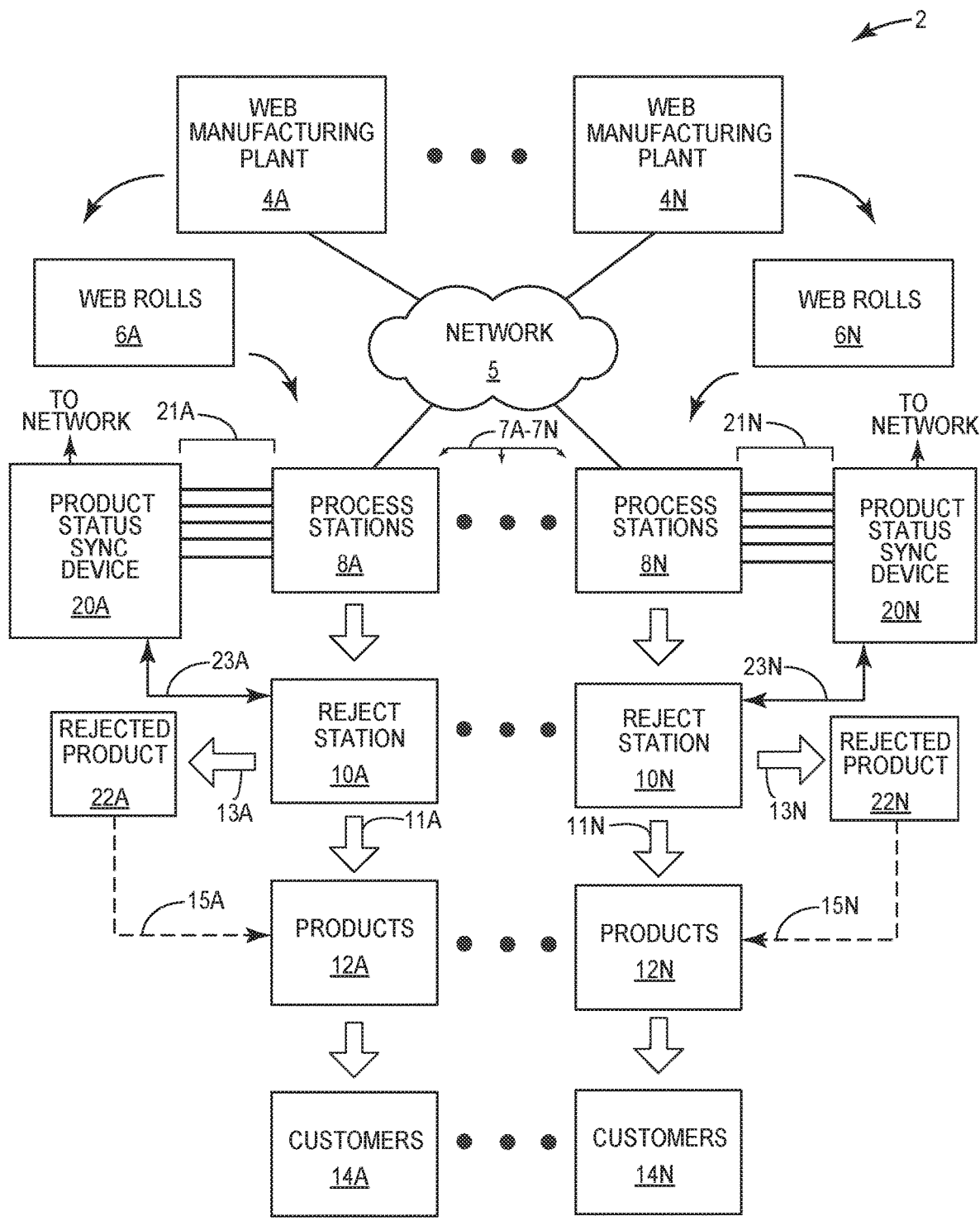
FIG. 1 is a block diagram illustrating an example manufacturing environment in which a product status synchronization device for synchronization of multiple process stations is shown in accordance with one or more examples described in this disclosure.

FIG. 1 is a block diagram illustrating example manufacturing environment 2 in which product status synchronization devices 20 are deployed for synchronization and temporal alignment of inspection results from multiple process stations in accordance with one or more examples described in this disclosure. In example manufacturing environment 2, web rolls 6A-6N are manufactured at one or more web manufacturing plants 4A-4N, and are processed through processing lines 7A-7N. Each processing line 7A-7N comprises a product status synchronization device 20A-20N, respectively, which tracks and temporally aligns the status or statuses assigned to product (e.g., regions or discrete parts) provided by web rolls 6A-6N.

In the example of FIG. 1, web manufacturing plants 4A-4N represent manufacturing sites that produce and ship web material in the form of web rolls 6A-6N. Web manufacturing plants 4A-4N may be geographically distributed. The manufactured web material may include any sheet-like material having a fixed dimension in one direction and either a predetermined or indeterminate length in the orthogonal direction. Examples of web materials include, but are not limited to, metals, paper, wovens, non-wovens, glass, polymeric films, flexible circuits, or combinations thereof. Metals may include such materials as steel or aluminum.

Wovens generally include various fabrics. Non-wovens include materials, such as paper, filter media, or insulating material. Films include, for example, clear and opaque polymeric films including laminates and coated films. As used herein, the term "film" broadly applies to any web material, including web material comprising multiple layers of different materials forming a composite web material, a material having one or more coatings applied to the material or a coating located with the web material, or a layer comprising a single layer of material forming the web material.

For many applications, the web materials of web rolls 6A-6N may have an applied coating, which generally are applied to an exposed surface of the base web material. Examples of coatings include adhesives, optical density coatings, low adhesion backside coatings, metalized coatings, optically active coatings, electrically conductive or nonconductive coatings, or combinations thereof. The coating may be applied to at least a portion of the web material, or may fully cover a surface of the base web material. Further, the web materials may be patterned or unpatterned.

Web rolls 6A-6N are shipped to one or more processing lines 7A-7N comprising process stations 8A-8N, which may be co-located within web manufacturing plants 4A-4N, or geographically distributed within different regions or countries. Process stations 8A-8N in some examples inspect individual products provided with each of web rolls 6A-6N, or in some examples inspect sections of the roll, or in other examples inspect the roll in its entirety. Specifically, each processing line 7A-7N comprises one or a plurality of process stations 8A-8N, respectively, physically located along the processing line, and include one or more mechanisms (not shown in FIG. 1) that physically transport the web material of a web roll through the processing line so that the products provided with the web material may be inspected by one or more process stations 8A-8N located along that particular processing line.

In various examples, one or more of processing lines 7A-7N may each comprise a same set of and/or a same type of process stations 8A-8N, respectively, relative to another one of the processing lines 7A-7N, although examples of processing lines 7A-7N are not limited to having a same arrangement and/or a same type of process stations for any given one of processing lines 7A-7N as provided by any other one of processing lines 7A-7N. An example illustration of a processing line in the example manufacturing environment 2 is further described by way of illustration. In this illustrative example, web rolls 6A are provided to the process stations 8A of processing line 7A. Processing line 7A includes a plurality of process stations 8A that are located at different positions along processing line 7A (as is further illustrated for example by processing line 50 shown in FIG. 2).

As illustrated in FIG. 1, process stations 8A are communicatively coupled to product status synchronization device 20A through a set of signal lines 21A. As products from web roll 6A move through processing line 7A, process stations 8A perform one or more inspections on the products, and each process station that performs an inspection of a product assigns a status to the product based on the inspection of that product. Process stations 8A are configured to provide signals to product status synchronization device 20A, including status information related to each of the inspected products, through signal lines 21A respectively. Product status synchronization device 20A is configured to track the statuses assigned to each product, and for a plurality of products, as the products move through processing line 7A, and to temporally align the signals in time for final disposition of the product.

For example, at some point along processing line 7A, the products included with web roll 6A subsequently arrive, in some examples one at time, at reject station 10A. As a product arrives at reject station 10A, product status synchronization device 20A is configured to provide status signal 23A indicative of a final status for the product. This final status is based on the statuses previously assigned to that product by each and/or any of process stations 8A that performed an inspection of the product as the product moved through process stations 8A. The final status may, for example, be used to determine whether the product being provided at reject station 10A is a "good" product that may become product 12A, as represented by arrow 11A. Products having a final status that indicate that the product is a "good" product are then prepared, for example by separation from the web material of web roll 6A, and shipped to customers 14A. In the alternative, the final status provided by status signal 23A for a product arriving at reject station 10A may indicate that the product is a "bad" product or is a "reject" product. Products indicated to be "bad" or "reject" products may be redirected, as indicated by arrow 13A, and become rejected product 22A. In some instances, rejected product 22A may be a product that is defective in some manner or aspect, but that may be repaired, and once repaired, may be returned, as indicated by dashed line 15A, as one of products 12A suitable for preparation and shipment to customers 14A. In other instances, "bad" or "rejected" product may be scrapped, may be recycled, or otherwise further redirected and/or processed depending in some examples on the nature of rejected product 22A and products 12A that rejected product 22A was intended to become. In various examples, products that are determined to be "good" products remain part of the web material or carrier web comprising the good product or products, and are conveyed out of reject station 10A as part of the web material or the carrier web, wherein reject station 10A may also be configured to remove "bad" or "reject" products from the web material or the carrier web at the reject station before further advancing the web.

As described herein, product status synchronization device 20A is configured to receive signals 21A from process stations 8A, each process station operating asynchronously relative to the other process stations. In addition, product status synchronization device 20A is configured to track the status assigned by each of process stations 8A to each given product, and to temporally align these statuses for each respective product in order to provide a final status for each of the products when each product arrives, respectively, at reject station 10A. Furthermore, product status synchronization device 20A provides a simple yet elegant user interface and other mechanisms for configuring the temporal alignment of signals 21A based on the physical distance each of process stations 8A are located relative to some predetermined location along processing line 7A. One or more of process stations 8A can be moved, reconfigured, or replaced, and process stations can be added or removed from processing line 7A, and a simple reconfiguration, as further described below, in most examples is all that is required to reprogram product status synchronization device 20A to properly track products and the status assigned to these products moving through processing line 7A based on these changes to process stations 8A.

In various examples, product status synchronization device 20A is communicatively coupled to network 5, and may receive information from the network and/or provide information to the network that may be shared with other devices coupled to the network. For example, network 5 may provide information to one or more of process stations 8A regarding the type of product being provided on web rolls 6A to processing line 7A, and thus control the configuration and/or the types of tests used to inspect the products being processed by processing line 7A. In various examples, product status synchronization device 20A may be configured to provide statistical information to the network, such as but not limited to a number and/or the types of rejects being detected in the products being processed by processing line 7A. However, in various examples product status synchronization device 20A is capable of providing the product status tracking features as described herein with or without being coupled to a network, such as network 5 shown in FIG. 1.

In various examples, one or more additional processing lines 7B-7N may be included in example manufacturing environment 2. Various ones of processing lines 7B-7N may process a same type of web roll 6B-6N, respectively, as is being processed by processing line 7A, although examples of manufacturing environment 2 are not so limited. In various examples, one or more of processing line 7B-7N are configured to receive web rolls 6B-6N, respectively, that comprise different types or arrangements of products, provided on the same or different types and/or arrangements of web material, and to perform one or more processes using process stations 8B-8N, respectively, on the products and/or web rolls provided to that processing line. As illustrated in FIG. 1, each processing line 7B-7N may comprise product status synchronization device 20B-20N, respectively, which is coupled to the respective process stations located on that particular processing line, and to provide status output signals 23B-23N to a reject stations 10B-10N, respectively, to allow products processed by that processing line to become products 12B-12N and be shipped to customers 14B-14N, or to become rejected products 22B-22N. As noted above with respect to processing line 7A, rejected products 22B-22N may be repaired and become products 12B-12N, respectively, as indicated by the illustrative depiction of dashed arrow 15N in FIG. 1. Further examples of systems, devices, and techniques of processing lines and product status synchronization devices are described below with respect to the additional figures, the examples, and the further description provided with this disclosure.

Figure 2:
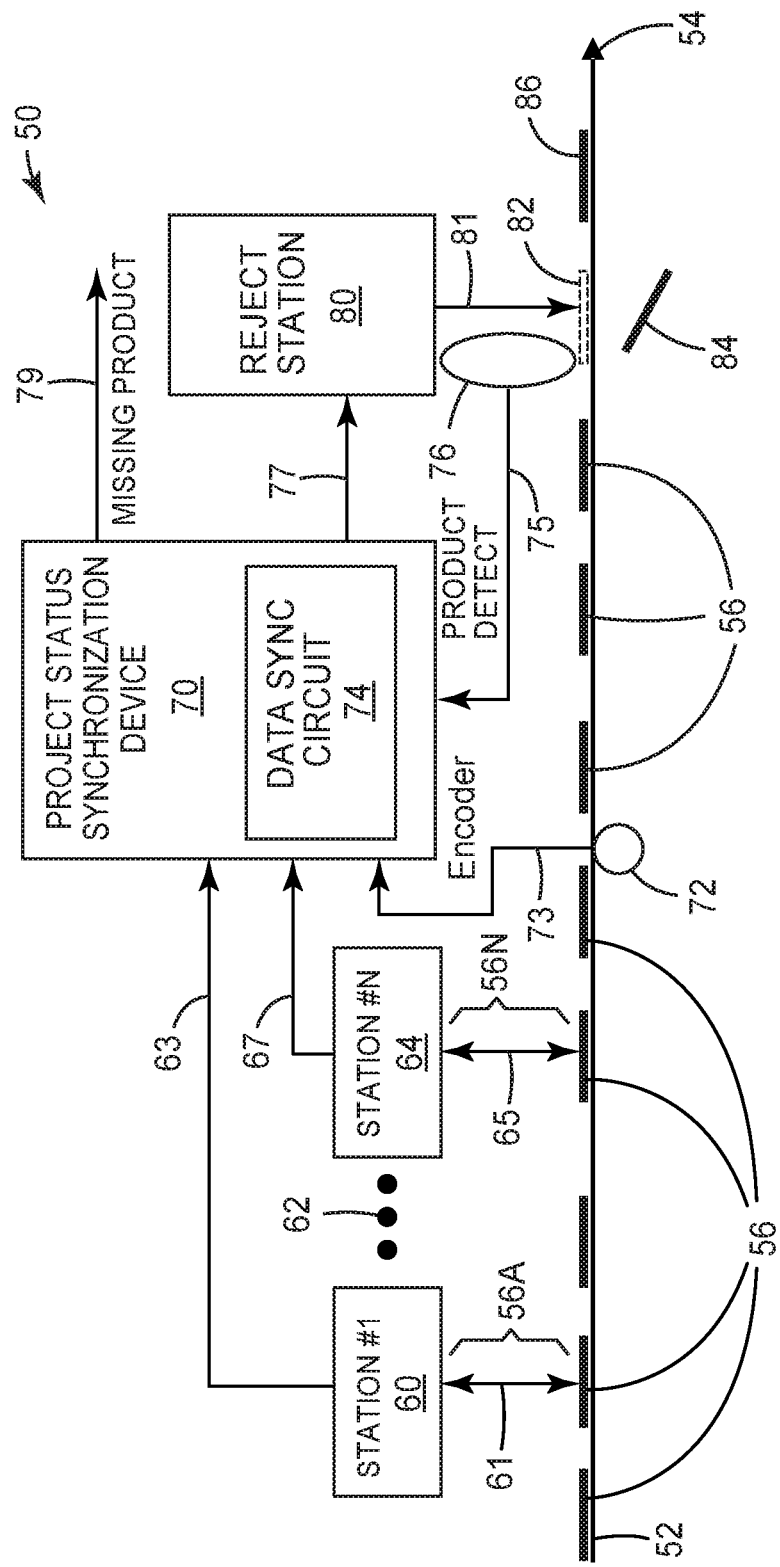
FIG. 2 is a block diagram providing a side view of an example processing line for synchronization of multiple process stations in accordance with one or more examples described in this disclosure.

FIG. 2 is a block diagram providing a side view of example processing line 50 for synchronization of multiple process stations in accordance with one or more examples described in this disclosure. In various examples, processing line 50 may be any of processing lines 7A-7N of FIG. 1, although examples of processing line 50 are not limited to processing lines 7A-7N as shown in FIG. 1. As illustrated in FIG. 2 processing line 50 comprises mechanism 52 configured to move one or more products 56 through processing line 50 in a direction indicated by arrow 54. In various examples, mechanism 52 is a sheet of web material that itself comprises products 56. For example, mechanism 52 may be a film or other type of sheet material having products 56 attached to, printed onto to, or contained within the web material comprising mechanism 52. In various examples, products 56 are moved through processing line 50 by virtue of the web material that comprises mechanism 52 being conveyed along through processing line 50. In some examples, mechanism 52 is conveyed along some type of support mechanism (not shown in FIG. 2) that supports the web material in substantially a horizontal direction that is coplanar with the direction of movement indicated by arrow 54. However, the physical arrangement of processing line 50 is not limited to a substantially horizontal direction of movement. In various examples, mechanism 52 comprises a web material suspended or otherwise provided, at least for some portion of the web material, in a vertical orientation, or at some angle other than a horizontal orientation. In various examples, a portion of the web material being provided for processing (such as inspection) along processing line 50 is provided so that access to both sides of the web material is provided. In such instances, a light source may be provided on a first side of the web material, and one or more inspection devices, such as machine vision cameras, may be provided on a side of the web material opposite the light source in order to receive light provided by the light source and provide an inspection of products 56 provided as a part of the web material, the inspection based at least in part on light transmission provided from the light source through products 56.

In various examples, mechanism 52 is a discrete element relative to products 56, such as a conveyor belt, and is configured to move products 56 along processing line 50 in the direction of arrow 54, wherein mechanism 52 is not a part of the actual products represented by products 56 that are being processed by processing line 50. Although mechanism 52 is illustrated in FIG. 2 as being a straight and level mechanism for moving products 56 through processing line 50, it would be understood by one of ordinary skill in the art that mechanism 52 may include inclines, declines, and/or turns to the left and/or right relative to the direction indicated by arrow 54 while still operating using the examples and techniques disclosed herein.

In various examples, processing line 50 includes encoder 72 configured to provide encoder output signal 73, encoder output signal 73 indicative of a distance of movement of mechanism 52. In various examples, encoder 72 is mechanically coupled to mechanism 52 such that movement of mechanism 52 provides a movement, such as a rotation of a part of encoder 72, which encoder 72 is configured to convert to encoder output signal 73 indicative of the movement of mechanism 52. In other examples, encoder 72 is configured to be optically or electromagnetically coupled to one or more features (not shown in FIG. 2) located on (for example printed on) or contained within mechanism 52, so that movement of the feature(s) of mechanism 52 passing by encoder 72 triggers encoder 72 to generate encoder output signal 73 indicative of movement of mechanism 52. In various examples, encoder output signal 73 is an electrical signal comprising a series of encoder pulses (in some examples, pulses comprising variation in an electrical voltage level (e.g., electrical pulses)), the number of encoder pulses corresponding to a distance of movement of mechanism 52, generally in the direction indicated by arrow 54. In some examples, encoder pulses may be indicative of movement of mechanism 52 in a direction indicated by arrow 54, and also indicative of any movement of mechanism 52 in a direction opposite the direction indicated by arrow 54. Many different devices, techniques, and combinations of device and techniques for providing encoder output signal 73 are possible, and are contemplated for use in conjunction with the examples of processing line 50 and other examples disclosed herein and the equivalents thereof. Therefore, the term "encoder" as used herein comprises any device(s), system(s), and/or technique(s) that may be employed to detect movement of the products and/or movement of a mechanism used to move products through a processing line, and to provide an output indicative of such movement, without being limited to any particular type of device or to any particular technique for detection of movement of the products and/or the mechanism. This includes not being limited to a "classic" definition of an electrical encoder that for example would be associated with tracking the rotations provided by a servo or a stepper motor. In addition, the use of the phrase "encoder output signal" is not limited to any particular type of signal, and may include any type of signal, such and an electrical signal, an optical signal, or a mechanical signal, which would be indicative of movement of products and/or movement of a mechanism used to move products through a process line.

Processing line 50 includes a plurality of process stations, illustrated by station #1 60-station #N 64. The number of process stations that can be included in processing line 50 is not limited to any particular number of process stations. Although illustrated as having a plurality of process stations, examples of processing line 50 can comprise a single and only one process station, such as but not limited to station #1 60. As illustrated, each process station is located at a position along processing line 50. Although illustrated as being on a same side (e.g., "above") mechanism 52, the actual position of some or all parts of a process station may be located at other positions relative to mechanism 52, such as to the side of mechanism 52, or located at an angle relative to a line perpendicular to a plane defined by mechanism 52 in the area of the process station. As shown in FIG. 2, product 56 is operable to be positioned at or within a processing zone associated with a particular process station. For example, processing zone 56A is associated with an area of processing line 50 wherein a product or products 56 that are provided within processing zone 56A may be processed by one or more processes 61 provided by station #1 60. In another example, processing zone 56N is associated with an area of processing line 50, wherein product or products 56 that are provided within processing zone 56N may be processed by one more processes 65 provided by process station #N 64.

Processes 61, 65 provided at any of process stations 60, 64 are not limited to any particular type of processing. In some instances, processes 61, 65 provided by process stations 60, 64 include some type of processing that physically transforms or otherwise alters the physical characteristic(s) of product 56 being processed. For example, processing can include addition of a piece, such as placement of a cover onto a product provided at a process station. In other examples, an environmental stimulation, such as heating, application of a laser to etch or heat, or application of a pressure incorporated with a leak test may be applied to a product provided at a given one of the process stations. In other examples, mechanical assembly, such as fastening together of the product or products provide at a given one of the process stations may be provided for example in the form of driving screws to fasten the product using automated screw-driving equipment. In some examples, processing of a product may not involve physical transformation of the product itself, but may include physical re-orientation of the product, such as flipping the product over, or rotating the product for example ninety-degrees, or to some other rotational orientation, relative to the direction of travel (generally represented by arrow 54) of product 56 through processing line 50.

In various examples, processes 61, 65 provided by the process stations comprises performing an inspection of product or products 56 provided in processing zones 56A, 56N. In various examples, inspection of product or products 56 comprises a visual inspection of product or products 56 performed by one or more machine vision cameras, or any type or types of cameras operable to perform a visual inspection of product or products 56. The type or types of inspection(s) performed by any given one of the process stations located along processing line 50 is not limited to any particular type of inspection. In various examples, the inspection includes a physical or visual verification of the proper assembly of product or products 56 provided at a given process station, for example verification that a cover has been placed on the product or products provided at the given process station, based on either a physical test performed for example by a test probe, or by visual inspection of the product or products that may be performed by cameras. Other forms of visual inspection that may be included as part of processes 61, 65 include measurement of the products or products for conformance to predetermined ranges of measured values for a color provided on the product or products, or for example conformance of printed patterns or shapes with respect to position and/or shape, and/or color provided with the product or products being inspected. In various examples, inspection of product or products 56 includes inspection of a product or products formed from a film, including but not limited to transparent or translucent films, for surface distortions and/or internal defects, such as bubbles or other defects that create undesired defects in the products that are to be ultimately converted from the film to produce the product or products being inspected. In various examples, product or products 56 being inspected comprise the film itself provided as a web material to the process station or stations, as opposed to discrete products provided with the web material.

Regardless of the type of processes 61, 65 performed by the process stations located along processing line 50, each process station may be configured to provide a process station output signal from the process station. In various examples, a given process station is configured to provide a "part present" signal when product or products 56 that have not previously been processed by that process station arrive at a processing zone associated with that process station. In addition, when a given process station performs processing on a product or products that have arrived at the processing zone associated with that process station, the process station is configured to process the product or products, and to assign a status to the product or products based on a result or results of the processing. The process stations are also configured to provide an output signal indicative of the status assigned to the product or products once the processing of the product or products has been completed.

In some examples, processes 61 and/or 65 represent discrete operations, such as performing an operation on a particular product that physically transforms the product and/or changes the orientation of the product relative to mechanism 52, or performs an inspection of a product, or any combination thereof. In some instances, these processes require that the product be stopped (e.g., not be moving through the processing zone) while one or more of processes 61, 65 are being performed. In other examples, for example in some instances when the process involves inspection, the product may continue to move through the processing zone of a process station while the inspection is being performed by that process station. In other examples, processing 61 and/or 65 may include processing that is not discrete, for example, not provided to a given product, but that instead involves sections or lengths of web material provided at the processing zone of a process station. For example, a web material being moved through processing line 50 may be stopped at various intervals and an inspection performed at that portion of the web material, regardless of whether that portion of the web material is designated to be an individual product at some point in the further processing of the web material. The inspection of the web material in such instances in not directed to individual products 56 provided with the web material, but instead is configured to inspect a continuum of a given product, such as a film or a web, that is continuously moved along through processing line 50 in the direction of arrow 54, and may be inspected along the entirety of the film or web, or may be inspected at one or more intervals along the film or web.

As illustrated in FIG. 2, each of process stations 60, 64 is communicatively coupled to a product status synchronization device 70. In addition, encoder output signal 73 is communicatively coupled to product status synchronization device 70. As used in this disclosure, "communicatively coupled" refers to any mechanism or technique operable to allow process stations 60, 64 and encoder 72 to provide information to product status synchronization device 70. In various examples, providing information to product status synchronization device 70 includes providing one or more electrical signals to product status synchronization device 70. In various examples, the electrical signals provided by each of the process stations includes a "part present" indication and one or more status indications assigned to product or products 56 that have been processed by the process station.

As illustrated in FIG. 2, station #1 60 is coupled to product status synchronization device 70 by output signals 63, and station #N 64 is coupled to product status synchronization device 70 by output signals 67. In various examples, output signals 63, 67 may be coupled between the respective process stations and product status synchronization device 70 by cables or busses comprising one or more electrical conductors (e.g., conductive wires). In various examples, the connections between one or more of the process stations may be provided, at least in part, by wireless connection(s). Any additional stations along processing line 50 may be coupled to product status synchronization device 70 in a similar manner in order to provide output signals from the additional station(s) to product status synchronization device 70.

In various examples, output signals 63 provided by station #1 60 include a "part present" signal provided to product status synchronization device 70 when a product or products arrive at processing zone 56A of station #1 60. The detection of the product or products at processing zone 56A is not limed to any particular technique for detection of products. In some examples, a product or products arriving at processing zone 56A are detected by a device such as a limit switch, a proximity sensor, a photo-sensor array, or any other type or types of sensor(s) (not illustrated in FIG. 2) capable of detecting the product or products are they move through processing line 50 and arrive at process station #1 60. These sensing devices in some examples generate and provide to product status synchronization device 70 a "part present" signal, in some examples a voltage pulse on an electrical signal line, as an indication that a product or products have arrived at process station #1 60. In various examples, detection of the arrival of a product or products at processing zone 56A is performed by visual inspection, for example by one or more machine vision cameras, that detect the arrival of the product or products at process zone 56A and provide the "part present" signal, in some examples as a voltage pulse on an electrical signal line, to product status synchronization device 70.

Once a product or products have arrived at process station #1 60, process station #1 60 performs processing 61 on the product or products, and based on the result of processing 61, assigns a status to the processed product or products. In some examples, the status assigned to a product, or individually to products, is a status indicating that the product is a "reject" or otherwise is a product that is not suitable for preparation and shipment to a customer, at least in the product's present form. In such instances, process station #1 60 is configured to provide a status signal to product status synchronization device 70 indicative of a "reject" status for the product or products associated with the most recent "part present" signal provided by process station #1 60.

In some examples, the status assigned to a product may be a grade, for example a grade of A, B, or C, that is indicative of how or what applications and/or customers the product is suitable for use in/for, respectively. For example, products such a films designed for use as a cover film for displays, such as the display of a computer monitor or a mobile device in some examples must meet the grade A standard, wherein products assigned a lower grade, such as grade B or C, may still be usable for other application, such as protective films applied to interior surfaces of a device that do not provide any visually associated functionality related to the device. In such examples, the process station is configured to provide a signal indicative of a grade associated with the processed product or products 56. In some examples, the grade may be communicated to the product status synchronization device 70 as a single or as a multiple-bit binary value representative of the grade assigned to the product or products 56 most recently processed by the process station.

In a manner similar to that described above for process station #1 60, process station #N 64 is configured to provide a "part present" signal as part of output signals 67 when a product or products arrive at processing zone 56N of process station #N 64. When a product or products have arrived at processing zone 56N, process station #N 64 is configured to perform process 65 on the product or products present at processing zone 56N, and to assign a status to the product or products based on the outcome of the process 65. In addition, process station #N 64 is configured to provide a signal to product status synchronization device 70, as part of output signals 67, which is indicative of the status assigned to the product or products 56 associated with the most recent "part present" signal provided by the process station #N 64. If any additional process stations are provided along processing line 50, each of these process stations may be configured to provide a "part present" signal as a product or products 56 arrive at the processing zone(s) associated with these process stations, respectively, and to provide additional output signal(s) indicative of status(es) assigned to the product or products 56 as the product or products are processed by these additional station(s).

As shown in FIG. 2, product status synchronization device 70 comprises data sync circuit 74. Data sync circuit 74 is configured to receive output signals 63, 67 provided by process stations 60, 64, and to receive encoder output signal 73 provided by encoder 72. Data sync circuit 74 is configured to receive a "part present" signal and a signal representative of a status assigned to product 56 that is associated with the "part present" signal from any of process stations 60, 64, and to register that status assigned by the process stations to that product. Once the status for a product 56 has been registered by data sync circuit 74, data sync circuit 74 is further configured to track that status for product 56, based on encoder output signal 73, as the product moves through processing line 50. As the product moves through processing line 50, additional process stations, (e.g., process stations 62, 64) may process and assign a status or statuses to product 56, and provide output signals indicative of these additional statuses to data sync circuit 74. Data sync circuit 74 receives these additional statuses, registers these additional statuses assigned to product 56, and continues to track each of the statuses assigned to product 56 by all the process stations that have assigned a status or statues to product 56, separately and independently, as the product continues to move through processing line 50.

At some point, product 56 has moved through the last process station along processing line 50, and data sync circuit 74 is configured to determine a final status for product 56 based on the statuses assigned to product 56 as the product moved through the processing line 50. In some examples, product 56 arrives at a predetermined location, such as reject station 80, wherein the arrival of the product at reject station 80 is illustrated as product 82. As described herein, data sync circuit 74 temporally aligns the statuses received from upstream process stations 60, 64 such that a final status for product 82, as determined by data sync circuit 74, can be provided as product status output signal 77 to reject station 80 at the appropriate point in time when the respective product reaches the reject station. In various examples, if product status output signal 77 indicates that product 82 is a "bad" or "reject" product, reject station 80 is operable to perform process 81 on product 82, in some examples to remove or redirect product 82 from the flow of products moving out of reject station 80, as illustrated by product 84 being removed from mechanism 52. In various examples, processing 81 includes marking product 82 in some manner to indicate a final status determined for product 82, such as marking product 82 as a "bad" or "reject" product, or marking product 82 with a grade, such as grade A, B, or C as described above, for further processing based on the final status for product 82 provided to reject station 80 as product status output signal 77. In various examples, if the final status for product 82 provided by data sync circuit 74 as product status output signal 77 indicates that product 82 is a "good" product, product 82 may be moved out of reject station 80, as illustrated by product 86, for further processing and preparation as a product to be shipped to customers. In various examples, moving "good" products out of the reject station includes the product remaining part of a carrier web, and moving the product out of the reject station by advancing the carrier web out of the reject station.

Reject station 80 in some examples includes product detect sensor 76 located at reject station 80 and configured to detect the presence of a product (e.g., product 82) at the reject station, and to provide product detect signal 75 indicative of the presence or absence of a product at the reject station. In various examples, product detect signal 75 is an electrical signal, for example a change in voltage level or a voltage pulse, that is provided as product detect signal 75 when product detect sensor 76 detects a product being present at reject station 80. As shown in FIG. 2, data sync circuit 74 is configured to receive product detect signal 75 provided by product detect sensor 76. In various examples, data sync circuit 74, compares the tracking of product 56 through processing line 50 to reject station 80 with product detect signal 75 indicative of whether product 82 is or is not present at reject station 80. Data sync circuit 74 in various examples is configured to determine that a missing product condition exists when product 82 is expected, based on tracking provided by data sync circuit 74, at reject station 80, but the expected product is not detected by product detect sensor 76. In various examples, data sync circuit 74 provides an alarm output signal on a missing product detected output 79 when data sync circuit 74 determines that a missing product condition exists. In various examples, this alarm output signal is coupled to other devices (not shown in FIG. 2), such as a computer network (e.g., network 5 shown in FIG. 1) or a programmable logic controller (e.g., "PLC"—not shown in FIG. 2) that are operable to provide alarms and/or further control the operation of processing line 50 based on receipt of the alarm output signal provided by data sync circuit 74. In various examples, data sync circuit 74 of FIG. 2 is incorporated into one or more of the products status synchronization devices 20A-20N shown and described with respect to FIG. 1, although examples of data sync circuit 74 as shown in FIG. 2 are not limited to being incorporated into the examples of product status synchronization device 20A-20N of FIG. 1.

Figure 3:
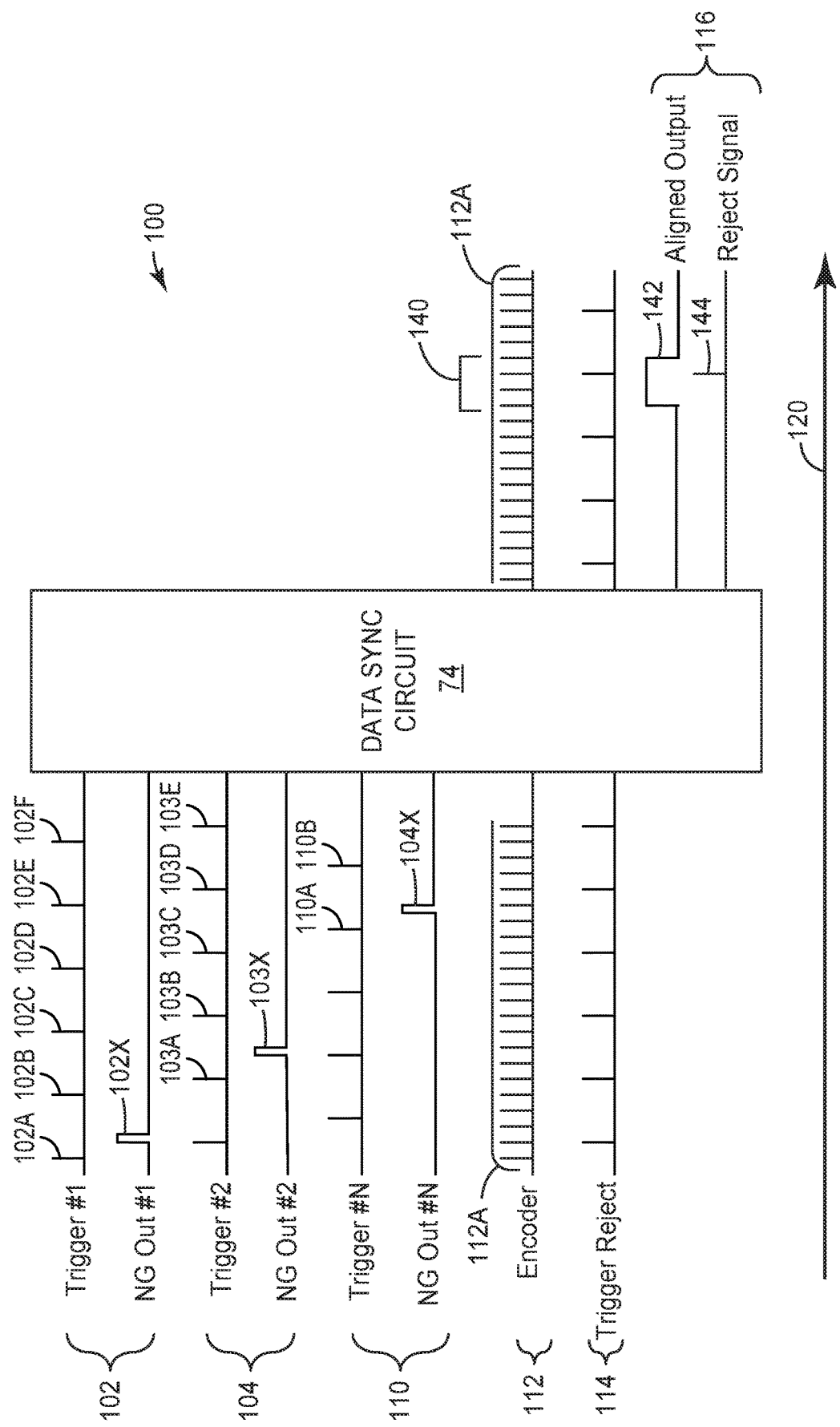
FIG. 3 is a timing diagram providing an example illustration of one or more signals utilized to provide product status tracking in accordance with one or more examples described in this disclosure.

FIG. 3 is timing diagram 100 providing an example illustration of one or more signals utilized to provide product status tracking in accordance with one or more examples described in this disclosure. For illustrative purposes, timing diagram 100 of FIG. 3 illustrates signals provided by a plurality of process stations positioned along a processing line, wherein discrete products are moving through the processing line and are provided on a one-at-a-time basis for processing at each of the process stations. However, examples of processing lines and combinations of products, or the types of processes performed on these products to generate the signals illustrated in FIG. 3, are not limited to these particular arrangements of products, or any particular types of processes, and may comprise multiple products being processed at a single process station at a same time, and/or product being continuously processed rather than discrete products being processed on a one-at-a-time basis at the process stations. In addition, the "processing" referred to as generating the signals as illustrated in FIG. 3 may be referred to specifically as inspection processes. However, the processes performed by process stations generating the signals illustrated in FIG. 3 are not limited to inspection processes, and may comprise any of the processes describe throughout this disclosure, and the equivalents thereof.

As illustrated in FIG. 3, data sync circuit 74 is configured to receive first set of signals 102 representative of signals that may be provided from a first process station, second set of signals 104 representative of signals that may be provided by a second process station, and Nth set of signals 110 representative of signals that may be provided by a Nth process station. Data sync circuit 74 is also configured to receive encoder output signal 112. Each of signals 102, 104, 110 represent sets of signals provided by process stations that are located at different locations along a processing line. For example, the first set of signals 102 may be provided by first process station 60, second set of signals 104 may be provided by another process station, and Nth set of signals 110 may be provided by process station 64, located at different positions along processing line 50, all as illustrated in FIG. 2. Again using FIG. 2 as an example, encoder output signal 112 illustrated in FIG. 3 in some examples is provided by encoder 72 as encoder output signal 73 as shown in FIG. 2.

Referring again to FIG. 3, encoder output signal 112 provides a stream of pulses 112A, wherein the pulses and the spacing between each pulse represent a movement of the mechanism (such as mechanism 52 shown in FIG. 2) that moves the one or more products (e.g., one or more products 56 illustrated in FIG. 2) through the processing zones of the process stations providing sets of signals 102, 104, 110, the movement represented by and in a direction indicated by arrow 120. By way of example, each encoder pulse 112A of encoder output signal 112 will be provided when the mechanism moving products through the processing line has moved a predefined distance, for example 2.5 centimeters (one inch), in the direction indicated by arrow 120. Continuing with this illustrative example, a group of ten encoder pulses 112A provided by encoder output signal 112 would represent a movement of a distance of 25.4 centimeters (ten inches) in the direction indicated by arrow 120 of the mechanism coupled to the encoder providing encoder output pulses 112A. By providing encoder pulses 112A based on a distance moved by the mechanism (as represented by arrow 120), the speed, variations in the speed, or even the stopping and starting of the movement of the mechanism does not affect the spacing, and thus the count, of the number of encoder pulses 112A associated with movement of the mechanism. Thus, the movement of one or more products being conveyed by the mechanism relative to the movement of the products through the processing line can be tracked based on the count of encoder pulses 112A received by data sync circuit 74. In other examples, a different number of encoder pulses 112A could be provided for a given distance of movement of the mechanism represented by arrow 120, and thus, different resolutions can be provided for a same amount of movement of the mechanism. For example, instead of providing one encoder pulse 112A per 2.5 centimeters (one inch) of movement of the mechanism represented by arrow 120, ten encoder pulses could be provided for this same 2.5 centimeters (one inch) of movement of the mechanism, thus providing a resolution of 2.5 millimeter (0.1 inch) of movement of the mechanism for each encoder pulse 112A generated. The resolution of encoder pulses 112A relative to the distance of movement of the mechanism can be configured by the encoder providing the encoder pulses. In various examples, settings within data sync circuit 74, including the setting of register lengths within data sync circuit 74, are configured to correspond to the resolution of encoder pulses 112A in order to provide proper tracking of products through the processing line by data sync circuit 74.

Data sync circuit 74 is configured to receive encoder output signal 112, and to synchronize encoder output signal 112 with each sets of signals 102, 104, and 110 so that as a product status for a particular product that has been processed by one of the process stations is assigned to the product and provided to data sync circuit 74, the status assigned to that product is stored (registered) and tracked within data sync circuit 74 as the product proceeds through the processing line. The tracking of the statuses assigned to the products is based on encoder pulses 112A. Each set of signals 102, 104, and 110 may provide a separate status for that same particular product as that particular product moves through the process stations providing set of signals 102, 104, and 110. After the particular product has moved through the last of the process stations, a final status, based on a concatenation of the statuses determined for the product and tracked through the processing line, may be provided for the product when the product arrives at a predetermined location. The final status for the product may be provided as output status signal 116 when the product arrives at the predetermined location on the processing line, for example at a reject station located along or downstream from the last process station providing signals to data sync circuit 74. Based on finals status output signal 116 provided for a given product, further processing and/or redirection of the product may be provided by one or more devices (not shown in FIG. 3) associated with the predetermined location or the reject station.

With respect to the generation of set of signals 102, a first process station located along a processing line detects a product arriving at the processing zone associated with the first process station, and generates and outputs a "part present" pulse on the Trigger #1 signal line. Series of pulses 102A, 102B, 102C, 102D, 102E, and 102F illustrate a series of pulses provided in response to a sequence of products arriving at the first process station, wherein pulse 102F indicates the arrival of a product at the first process station, and pulse 102E indicates the arrival of a product at the first process station after the arrival of the product that triggered 102F pulse. Pulses 102D, 102C, 102B, and 102A indicate the arrival of a subsequent sequence of products at the first process stations, one product at a time, in sequence from 102D, then 102C, then 102B, and finally 102A. Each of pulses 102A, 102B, 102C, 102D, 102E, and 102F represents an indication of "part present" at the first process station providing set of signals 102. The sequence of pulses is received at the TRIGGER #1 input to data sync circuit 74. Using pulse 102B as an example starting point, a product arrives at the first process station providing the set of signals 102, and pulse 102B is provided on the Trigger #1 signal line indicating a "part present" at the first process station. In addition to providing the "part present" indication, the first process station is configured to process the product associated with 102B "part present" signal, for example to perform an inspection of the product, and to provide pulse 102X on the NG OUT #1 signal line sometime after issuing 102B pulse but before issuing 102A pulse. A pulse 102X provided on the NG OUT #1 signal line indicates that product whose arrival at the process station generated the 102B pulse has now been processed, and is determined to be a "bad" or "reject" product. Pulse 102X provided on the NG OUT #1 signal line is an indication of this "bad" or "reject" product status assigned by the first process station providing set of signals 102 for the product associated with "part present" signal 102B. Data sync circuit 74 is configured to receive the pulse 102X, and to register this "bad" or "reject" status assigned by the first process station to the product associated with the product present signal 102B. As the product associated with signal 102B moves along through the processing line, data sync circuit 74 is configured to track this registered status for the product as the product continues to move through the processing line, the tracking based on encoder pulses 112A received by data sync circuit 74.

As previously described, the spacing between the pulses on the Trigger #1 signal line are based on movement of the mechanism represented by arrow 120 moving products into the first process station providing set of signals 102, indicated by the pulse 102B, and then moving the product out of the process station and having a second product arrive at that same first process station, the arrival of the second product indicated by pulse 102A. The spacing existing between pulses 102A and 102B is not therefore dependent on a time period, but is determined by the movement of the mechanism moving the product into and out of the first process station providing set of signals 102. In contrast, the space between "part present" pulse 102B and product reject pulse 102X may be a function of the time required for the first process station providing set of signals 102 to perform the processing on the product that has arrived at the process station, and to then make the determination of a status to be assign to the product as a result of the processing of that product.

For example, when a product arrives at the first process station that is providing set of signals 102, "part present" signal 102B may be provided on the Trigger #1 signal line. At that same time, the product may continue to move though the first process station while an inspection process, such as would be provided by a machine vision system, may be performed on the product while the product is moving. In other examples, the product is stopped long enough at the first process station to capture an image of the product, and then the product is moved out of the first process station while image processing is being performed on the captured image. As the product is moving, encoder pulses 112A would continue to be provided as encoder output signal 112 to data sync circuit 74, and these pulses are used by data sync circuit 74 to track the movement of the product through and out of the first process station. At some point the process at the first process station is completed, and a status for the product, based on the processing of that product, is determined. If the status for the product is determined to be a status of "bad" or "reject" for the product, the first process station provides pulse 102X on the NG OUT #1 signal line. The "reject" status for the product provided by the first process station that was assigned to this product by the first process station is received and registered by data sync circuit 74, and will continue to be tracked, based on encoder pulses 112A, until the product arrives at a predetermined location of the processing line, such as at the reject station represented as point 140.

By way of example, if the first process station providing set of signals 102 is 76 centimeters (30 inches) from the reject station represented by point 140 along the processing line, the status provided for the product generating the 102B product present signal and having a reject status indicated by signal 102X on the NG OUT #1 will be tracked, based on encoder pulses 112A received by data sync circuit 74, so that when this product arrives at the reject station illustrated by point 140, data sync circuit 74 will issue a reject signal pulse 144, indicating that the product present at a the reject station is a bad (rejected) product. If encoder pulses 112A are set so that each encoder pulse 112A represents 2.5 centimeters (one inch) of movement represented by arrow 120, then after registration of the rejected status for the product provided at the first process station that generated product present signal 102B, the status will be tracked for thirty encoder pulses, which places the "rejected" product at the reject station. This results in reject signal pulse 144 being generating after a count of thirty encoder pulses 112A have been received by data sync circuit 74 following the point where product present 102B signal was received.

In an alternative example, a product arriving at the first process station providing set of signals 102 indicates that product has arrived by providing "part present" pulse 102C. As the product is processed and moved out of the first process station, encoder pulses 112A continue to be received at data sync circuit 74. If by the time the next "part present" signal, represented by pulse 102B, have been received by data sync circuit 74 and reject signal 102X has not been provided on the NG OUT #1 signal line, data sync circuit 74 is configured to register an indication of a "good" product present at the first process station associated with the product that generated "part present" signal 102C, and will track that "good" product status based on encoder output pulses 112A until the product arrives at the reject station illustrated as point 140. At that time, if the product being provided at reject station illustrated as point 140 does not have any statuses of "bad" or of "reject" assigned to the product by any other of the process stations, the product has a final status of a "good" product, and will proceed on past the reject station as a good product. In various examples, the "good" product will remain as part of the carrier web, and will proceed on past the reject station as a result of the carrier web being advanced through of the reject station.

As the products arrive and leave the first process station, they are moved along through the processing line, and at some point arrive at the second process station providing set of signals 104. The arrival of products at the second process station generates a sequence of pulses 103A, 103B, 103C, 103D, 103E on the TRIGGER #2 signal line of the set of signals 104. Pulse 103E represents the arrival of a product at the second process station, following be the arrival of a product causing the 103D pulse to be generated, following by products generating pulses 103C, 103B, and 103A in sequence. The arrival of a product at the second process station indicated by "part present" pulse 103B provided on the Trigger #2 signal line is now used as an example. Once the product associated with the generation of pulse 103B has arrived at the second process station, the second process station may perform a process, such as performing an inspection of the product, and if processing of the product by the second process station results in a determination that the product associated with the pulse 103B is a "bad" or "reject" product, a "reject" pulse 103X is provided on the NG OUT #2 signal line. If pulse 103X is provided after product present 103B pulse is provided but before the next "part present" signal 103A is provided on the TRIGGER #2 signal line, data sync circuit 74 will register a "reject" status for the product processed at the process station associated with pulse 103B. Data sync circuit 74 will track this status for the product, based on encoder pulses 112A, until the product arrives at the reject station at point 140, and then again, based on reject status assigned to the product by the second process station, will provide reject signal pulse 144 indicating that the product that is present at the reject station illustrated as point 140 is a bad or rejected product. The status assigned to a product by the second process station is tracked by data sync circuit 74 independently and separately relative to any other status or statuses assigned to that same product by other process stations.

By way of example, if the second process station providing set of signals 104 is located 51 centimeters (20 inches) from the reject station represented by point 140 along the processing line, the product associated with generating "part present" signal 103B and having a "reject" status indicated by signal output 103X on the NG OUT #2 signal line will be tracked, based on encoder pulses 112A, so that when this product arrives at reject station 40, data sync circuit 74 will issue reject signal pulse 144 indicating that the product present at the reject station is a bad (rejected) product. If the encoder pulses are set so that each pulse 112A represents 2.5 centimeters (one inch) of movement of the mechanism illustrated by arrow 120, then after registration of the rejected status for the product provided at the second process station that generated "part present" signal 103B and is now associated with the reject status will be tracked for twenty encoder pulses 112A, which should place the "rejected" product at the reject station. This will result in reject signal pulse 144 being provided to the reject station after a count of twenty encoder pulses has been received by data sync circuit 74 after receiving "part present" pulse 103B at data sync circuit 74.

In an alternative example, product present 103C pulse is provided by the second process station indicating that a product has arrived at the second process station. As the product is processed and moved out of the second process station, encoder pulses 112A continue to be received at data sync circuit 74. If by the time the next "part present" signal represented by pulse 103B has been received by data sync circuit 74 and reject signal 103X has not been provided on the NG OUT #2 signal line, data sync circuit 74 is configured to register an indication of a "good" status for the product at the second process station associated with product present signal 103C, and will track that "good" product status based on encoder output pulses 112A until the product arrives at the reject station illustrated as point 140. At that time, if the product being provided at reject station of point 140 does not have any statuses of "bad" or of "reject" assigned to the product by any other of the process stations, the product has a final status of a "good" product, and will proceed on past the reject station as a good product.

In a similar manner, data sync circuit 74 is configured to receive signals, such as set of signals 110, for additional process stations, and to register a status or statuses assigned by each of these additional stations to products as these products arrive and are processed by these additional process stations. Further, data sync circuit 74 is configured to track these registered statuses for each product, separately and independently of the status assigned to each product by any other process station, and determine a final status for each product as the product arrives at the reject station illustrated at point 140 in FIG. 3.

Based on the above description, and using the example distance of 76 centimeters (30 inches) for the first process station, 51 centimeters (20 inches) for the second process station, and 25 centimeters (10 inches) for the Nth process station relative to the location of the reject station, a particular product should arrive at the reject station when thirty encoder output pulses 112A have occurred after the product arrives at the first process station. At the first process station, a status, for example "good" or "bad" is registered for the product at the first process station. When ten encoder pulses 112A have occurred after arrival at the first process station, the product should have arrived at the second process station, and again a status may be assigned, for example "good' or "bad," for that product at the second process station. When ten more encoder pulses 112A have occurred after the product's arrival at the second process station, the product should have arrived at the Nth process station. Once at the Nth process station, the Nth process station may provide processing to the product, and assign a status, for example "good" or "bad," for the product relative to the process performed on that product at the Nth process station. After ten additional encoder pulses 112A have occurred after the product has arrived at the Nth process station, the product should have arrived at the reject station. If data sync circuit 74 determines that the product at the reject station, based on the tracked statuses for that product from each of the process station, is a "bad" or "reject" product, data sync circuit 74 is configured to provide a pules on reject signal 144 that may be provided to devices (not shown in FIG. 3) at the reject station to trigger reject processing of the product. In the alternative, if data sync circuit 74 determines that no "bad" or "reject" statuses have been assigned to the product at the reject station by any of the process stations, data sync circuit 74 is configured to not issue reject signal 144, and thus to allow the product present at the reject station to proceed as a "good" part.

Thus, for each process station along a processing line, by using a series of product present pulses, and by providing or not providing a reject pulse between the "part present" signals at each process station, a status for a product that data sync circuit 74 is configured to register and track for each of the process stations as the product passes through an entire processing line is disclosed. By then simply tracking a number of encoder pulses representative of movement of the product through the processing line, the statuses of the product assigned to the product by the process stations can be tracked by data sync circuit 74 to a predetermined location, such as a reject station, were a final status for the product can be determined by that data sync circuit 74 based on the concatenated statuses assigned to the product by the process stations included along the processing line, and as registered to and tracked with a product by data sync circuit 74.

The first process station, second process stations, and the Nth process stations providing sets signals 102, 104, and 110 are illustrative of signals that may be provided by process stations coupled to data sync circuit 74, where signals that may be provided to data sync circuit 74 are not necessary limited to the types of signal illustrated in FIG. 3. Processing of signals is not necessarily limited to those illustrated in FIG. 3 as described above. For example, in an alternative example, instead of a process station issuing a pulse on the NG OUT signal line indicative of a "bad" or "reject" status for a part, the presence of the pulse, such as pulse 102X on the NG OUT #1 signal line could be used to indicate a "good" part, and a lack of this pulse, for example as illustrated by the lack of a pulse on the NG OUT #1 signal line with respect to the space between pulses 102B and 102C, would be indicative of a "bad" or "reject" part. In addition, with respect to reject signal 144, the issuance of pulse 144 could be made when a "good" part is present at the reject station indicated by point 140, and the lack of issuance of pulse 144 is taken to mean that the product present at the reject station is in fact a "bad" or "reject" part. Further, the total number of sets of signals that may be provided to data sync circuit 74 is not limited to a particular number, and may include any number of sets of signals for which the data sync circuit 74 is configured to receive.

Figure 4:
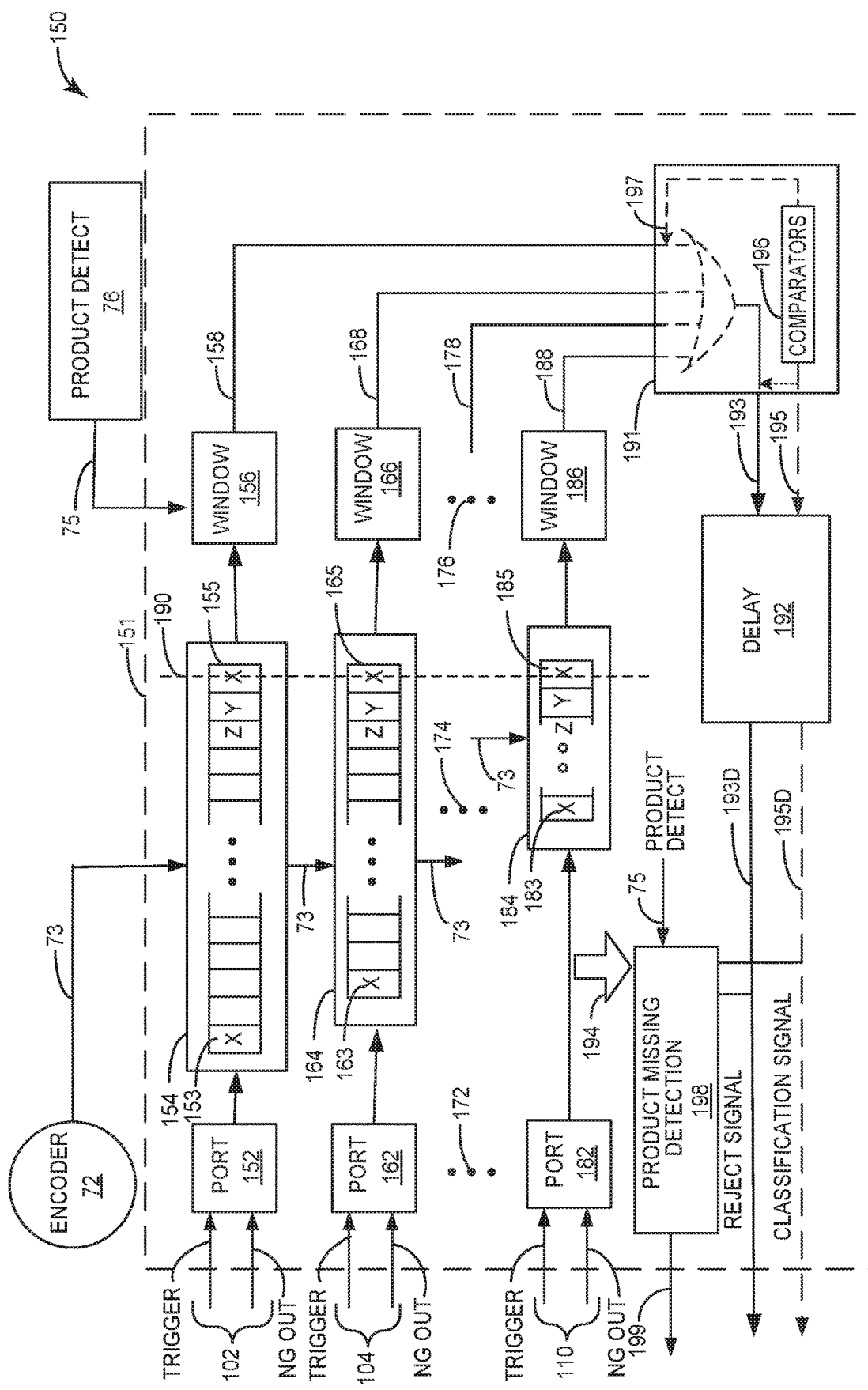
FIG. 4 is a block diagram providing an example illustration of functional blocks comprising a data sync circuit for tracking statuses provided by multiple process stations in accordance with one or more examples described in this disclosure.

FIG. 4 is a block diagram providing an illustration of functional blocks 150 comprising data sync circuit 151 for tracking statuses provided by multiple process stations in accordance with one or more examples described in this disclosure. Exemplary data sync circuit 151 illustrated and described with respect to FIG. 4 in some examples is data sync circuit 74 illustrated and described with respect to FIG. 2 and FIG. 3, although examples of data sync circuit 151 are not limited to comprising the data sync circuit 74, and may be implemented in any examples of a data sync circuits for tracking statuses provided by multiple process stations as described herein, and the equivalents therefore.

As illustrated, data sync circuit 151 is configured to receive set of input signals 102 at port 152, set of input signals 104 at port 162, and set of input signals 110 at port 182. In addition, data sync circuit 151 is configured to be coupled to an encoder, such encoder 72, and to receive encoder output signal 73 provided by encoder 72. In various examples, each of set of input signals 102, 104, and 110 is configured to be coupled to individual and different process stations positioned along a processing line. Data sync circuit 151 is configured to receive signals on these sets of input signal lines, including signals indicative of a status assigned to a product that was or is present at the process station and was just processed at the respective process station coupled to the sets of input signals, to register this status, and to track this status as products are moved through the processing line.

As illustrated, each of set of signals 102, 104, 110 is coupled to individual port 152, 162, and 182, respectively. In various examples, each port is configured to receive input signals related to a "part present" (e.g., "TRIGGER") signal and a product status (e.g., "NG OUT") signal provided by a given one of process stations located along the processing line that data sync circuit 151 is coupled to, and for which data sync circuit 151 is being used to track product statuses for. Each process station that is located along the processing line is coupled individually to a separate one of the ports provided with data sync circuit 151. The number of ports, and thus the number of process stations that data sync circuit 151 may be coupled to, is not limited to any particular number of process stations, and additional process stations may be coupled to data sync circuit 151 via additional ports. Each of ports 152, 162, and 182 is individually and separately coupled to one of registers 154, 164, and 184, respectively. Port 152 is configured to receive signals provided by set of signals 102 and is coupled to register 154, port 162 is configured to receive signals provided by set of signals 104 and is coupled to register 164; and port 182 is configured to receive signals provided by the set of signals 110 and is coupled to register 184. Any additional ports included in data sync circuit 151 would also be individually and separately coupled to a separate set of registers in same manner as described for ports 152, 162, and 182.

In various examples, each of ports 152, 162, and 182 includes circuitry configured to receive the signals provided receptively by the sets of signals 102, 104, and 110, and to register a status for a product "X," represented by the "X" shown in bit positions 153, 163, 183, into registers 154, 164, and 184, respectively, based on the received signals at each port. By way of illustration, port 152 is configured to monitor signals provided by set of signals 102, and to register a status "X" associated with a product "X" that is present or was just present and that was processed by the particular process station coupled to provide the signals on set of signals 102. Port 152 is configured to receive the signals from set of signals 102 based on particular signal parameters, such as voltage levels, and convert the pulses or other types of signals representative of data received from set of signals 102 to a status bit or value that can be registered into a first bit position as status "X" at bit position 153 in register 154. In various examples, the signals provided by set of signals 102 correspond to a TRIGGER input pulse indicative of a product present at the process station coupled to set of signals 102, and a NG OUT pulse provided following the product present pulse and before the issuance of the next product present pulse if the product associated with the first product present pulse is determined to be a 'bad" or a "reject" product by the process station. In various examples, port 152 is configured to receive the first product present pulses, to wait until the next product present pulse is received, and if a pulse is provided on the NG OUT signal line in the time between receiving the first product present signal and receiving another subsequent product present signal, to register a status in the first bit position 153 of register 154 indicative of assigning a "bad" or "reject" status for the product associated with the product "X" by the process station. In the alternative, if a product present signal is received at the TRIGGER input for the set of signals 102, and a subsequent "part present" signal is received at the TRIGGER input for set of signals 102 is received without having received a pulse or other signal on the NG OUT signal line of set of signals 102 indicative of a "bad" or "reject" product, a status of a "good" product is assigned to and registered for product "X" at bit position 153 of register 154. As noted above, in alternative examples, the absence of a pulse on the NG OUT signal line between "part present" pulses is interpreted as a "bad" or "reject" status having been assigned to the part associated with the first of the "part present" trigger pulses, and the presence of a pulse on the NG OUT signal line between the "part present" trigger pulses can be interpreted as a "good" status being assigned to the part that generated the earlier "part present" pulse at a given process station.

In one example, a binary "1" is input into bit position 153 if the status assigned to a product by the process station coupled to set of signals 102 is a "bad" or "reject" product, and a binary value of "0" is input into bit position 153 if the status assigned to a product by the process station coupled to set of signals 102 is a "good" product. In other examples, a multiple-bit value associated with a product being processed at the process station providing set of signals 102 may be provided as a status for a product instead of a simple binary value. For example, set of signals 102 may include a plurality of data lines associated with the NG OUT signal, and thus would be configured to provide a binary value, such as a binary value between zero and 255, using an eight-bit set of data lines, that represents a status for product "X". In such examples, bit position 153 of register 154 would be configured to register this value as a status assigned to the product "X" being processed by the process station providing set of signals 102.

Register 154 comprises a number of bit positions corresponding to a distance that the process station for which register 154 is tracking status for is located from a predetermined location along the processing line. By way of an illustrative example, a first process station coupled to port 152 and providing set of signals 102 is located 76 centimeters (30 inches) from a predetermined location located downstream along a processing line from the first process station. For purposes of this illustrative example, each encoder pulse provided by encoder 72 and received at data sync circuit 151 as encoder output signal 73 represents 2.5 centimeters (one inch) of movement of the mechanism moving products through the processing line. As such, under normal circumstances a product initially located at the first process station would be moved to the predetermined location along the processing line after thirty input pulses are received from encoder output signal 73. In this example, for each pulse received from encoder 72, the bits in register 154 are shifted one position to the right, and after thirty such pulses, and thus thirty such shifts of register 154, the status of product "X" initially entered at first bit position 153 would be shifted thirty times, and is now located (with its same status indication for product "X") at bit position 155 of register 154. Thus, by synchronizing bit shifts within a register associated with a particular process station to encoder pulses, and thus to movement of the mechanism moving products through the processing line, the status assigned to a product passing through and in some cases being processed by that process station can be tracked as the product moves along the processing line from a given process station to a predetermined location along the processing line. In various examples, registers 154, 164, 184 operate as first-in-first-out ("FIFO") registers.

For each of registers 154, 164, and 184, a number of bit positions within the registers, respectively, corresponds to a distance that the particular process station for which the register is tracking status for is located from the same predetermined location along the processing line. Continuing with the illustrative example described above with respect to process stations located along the processing line and a bit length for registers 154, 164, and 184, a first process station coupled to port 152 is again is located 76 centimeters (30 inches) from a predetermined location located downstream from the first process station, and pulses provided by encoder output signal 73 represents 2.5 centimeters (one inch) of movement of the mechanism moving products through the processing line. As such, a product initially located at the first process station would be moved to the predetermined location along the processing line after thirty input pulses are received from encoder output signal 73. In a similar manner, a product status for this same product can be assigned by each of the process stations downstream from the first process station, tracked through the data sync circuit 151, and provided when the product arrives at the predetermined location as a final status provided for the product as assigned by the each of the process stations when the product arrives at the predetermined location.

For example, a second process station is coupled to port 162 and provides set of signals 104, and is located 51 centimeters (20 inches) from the same predetermined location described above with respect to the first process station. As such, the second process station is located 25 centimeters (10 inches) downstream along the processing line from the first process station. As the product is moved from the first process station toward the second process station, after ten encoder pulses have been received from encoder output signal 73 at data sync circuit 151, representing the product having moved 25 centimeters (10 inches) along the processing line, the product should have arrived at the second process station. As the product does arrive at the second process station, a product present signal, for example on the TRIGGER signal line associated with the set of signals 104, is received at port 162. If a pulse is then received at port 162 on the NG OUT signal line before a next product present signal is received on the TRIGGER signal line, port 162 is configured to register a bit status as a "bad" or "reject" status for product "X" at first bit position 163 of register 164. If the pules indicative of a next product arriving at the second process line is received from the TRIGGER signal line coupled to port 162 and no signal indicative of a "bad" or "reject" product has been received at port 162 on the NG OUT signal lines coupled to port 162, a status of a "good" product is registered in first bit position 163 of register 164 for product "X." A length in the form of a number of bits for register 164 is configured based on the distance the second process station is from the predetermined location. In this example, the second process station is 51 centimeters (20 inches) from the predetermined location, and again assuming that each pulse received from encoder output signal 73 represents 2.5 centimeters (1 inch) of movement of the mechanism moving products along the processing line, register 164 can be configured to have a register length of twenty bits total. In this example, for each pulse received from encoder 72, the bits in register 164 are shifted one position to the right, and thus after receiving twenty such pulses, and thus twenty such shifts of register 164, the status for product "X" initially entered at first bit position 163 would be shifted twenty times and is now located (with its same status indication for product "X"), at bit position 165 of register 164.

This same product "X" continues to move through the processing line and to arrive at additional process stations, and registers associated with each of these process stations are configured to receive status signals associated with product "X", register these status(es), and track the registered status(es) through registers 174, as described above with respective ports 152, 162 and registers 154, 164. At some point, product "X" will arrive at a final process station along the processing line being monitored and tracked, represented by set of signals 110, and coupled to port 182. In a manner similar to that described above, port 182 may be configured to receive the signal indicative of a product present and a status associated with product "X" from the process station coupled to port 182, and to register a status for product "X" into first bit position 183 of register 184 for product "X" as assigned by the process station coupled to port 182. The length of register 184 is configured based on a distance of the process station coupled to port 182 from the predetermined location so that as bits are shifted to the right in register 184 based on receipt of encoder pulses from encoder output signal 73, the status assigned to product "X" by the process station coupled to port 182 arrives at last bit position 185 of register 184 when the mechanism moving products through the processing line has been moved to the point that should provide product "X" at the predetermined location.

At this point, last bit position 185 of register 184 now aligns with last bit position 155 of register 154 and with last bit position 165 of register 164. If any additional registers are also coupled to track a status assigned to product "X," each of register(s) 174 will have a last bit position that provides a status for product "X" when product "X" arrived at the predetermined location based on a length configured for each of these registers corresponding to a distance from the process station providing the set(s) of signals being registered to register(s) 174, in a manner described above with respect to registers 154, 164, 184. This alignment of the last bit positions of each of registers 154, 164, 174, and 184 with the corresponding expected arrival of product "X" at the predetermined location is illustrated by dashed line 190.

Once the statuses for a given product (e.g., product "X") is provided at the bit positions shown along the alignment of dashed line 190, and overall status for product "X" may be determined. The status from each of last bit positions 155, 165 through 185 can be provided to concatenator 191, wherein an overall status for product "X" can be determined and provided as a signal at status output 193. In some examples, the status of product "X" at each of bit positions 155, 165, though 184 is represented by either a binary "1" for a reject status, and a binary "0" (zero) for a good product status. By simply providing these binary statuses as a series of inputs 158, 168, 178, 188 to a logic "OR" function, if any of the status provided by bit positions 155, 165, through 185 provide a binary "1" representing of a 'bad" or "reject" product as being present at the predetermined location, a final status of a "1" representative of a "bad" or "reject" product can be provided as a final status for product "X" by concatenator 191 at status output 193. In the alternative, if none of the statuses provided by register 154, 164, 174, and 184 at the bit positions along dashed line 190 indicate a "bad" or "reject" status, each of these statuses may be represented by a binary "0" such that when provided to a logical "OR" function of concatenator 191, the result is final status of "0" representative of a "good" status for product "X" provided at the status output 193 for product "X".

In various examples, alignment along dashed line 190 may be based on more than a single bit position for each register, and thus windows 156, 166, 176, through 186 may be provided to group a plurality of bits at the end of registers 154, 164, 174, through 184, respectively for each register, together to provide a status for product "X" to concatenator 191. For example, register 154 may include a set of the last three bit positions of register 154 that may include a status for product "X," wherein the resolution of the position of product "X" relative to the bit position of the register may not be exactly one-to-one. As such, in an example a group of the last bit positions of register 154 may include a bit that actually stores a status that is registered to product "X" as assigned by the process station coupled to and providing set of signals 102. Window 156 is configured to look at this group of last bit positions of register 154, and determine a status output for product "X" based on the data stored in these last bit positions, and to provide, on line 158, a status output for product "X" to concatenator 191. In various examples, the number of last bits included in the group of last bits of register 154 included in window 156 is a configurable number of bits. By way of illustration, window 156 may be configured to group the last three bit positions of register 154 together. Window 156 in some examples will provide a status of "bad" or "reject" product for product "X" on line 158 if any of these last three bit positions of register 154 provide an indication that product "X" is a "bad" or "reject" product. In a similar manner, one or more of windows 166, 176, 186 may be configured to group a last set of bit positions in registers 164, 174, 184, respectively, to provide a status on lines 168, 178, 188, respectively, for product "X" based on a status provided by this last group of bits respectively for each register. In various examples, windows 156, 166, 176, and 186 are individually configured to be used or disabled so that one, some, or all of the registers 154, 164, 174, and 184 can be individual configured to use or not use the window features, irrespective of whether the window feature is being utilized by or in conjunction with any of the other registers of the data sync circuit 151. Further, a size (number of bits) of a bit group configured to be used by one of windows 156, 166, 176, or 186 can be a different size for a bit group configured for use by another one of windows 156, 166, 176, or 186.

The operations performed by concatenator 191 are not limited to providing a binary logical "OR" function. As described above, a status assigned to a product and registered by any of registers 154, 164, 174, 184 may comprise a binary value represented by a plurality of bits rather than a single binary bit. For example, as status assigned by a register to a product "X" may be represented by a value designated by an eight-bit binary number. In various examples, the binary number is provided to concatenator 191, wherein concatenator 191 includes one or more comparators 196 used to evaluate the binary value, and to determine an intermediate status 197 or final status 193 for the product based on the results of the comparing the binary values to one or more predetermined threshold values, or by determining if these binary values fall within a predetermined range of values. In various examples, one or more of registers 154, 164, 174, and 184 provide multiple-bit input values, while other registers provide single bit input statuses (e.g., a binary "1" for a "bad" or "reject" product) for a same product. In such examples, concatenator 191 is configurable to provide the comparator functions to determine an intermediate status 197 of "good" or "reject" product for the register or registers providing the multiple-bit status inputs, and to combine these intermediate status outputs with the single bit statuses to generate and provide the final status of the product at status output 193. For example, register 154 may be configured to provide an eight-bit binary status value for product "X", while registers 164, 174, through 184 are each configured to provide a one-bit binary value indicative of whether product "X" has a "good" or "reject" status. In this example, concatenator 191 is configured to compare the multiple-bit value provided by register 154 to a threshold value, and if the multiple bit value provided by register 154 is equal to or greater than the threshold value, to provide an intermediate status of "good" for product "X," and if the multiple-bit value is less than the threshold values, to provide an intermediate status of "reject" for product "X". In this example, the intermediate status is then combined, for example using the logical "OR" function, with the statuses provided by each of registers 164, 174, 184 to generate the final status for product "X" at output status 193.

Other configurations for producing inputs provided on lines 158, 168, 178, and 188, including different combinations of multiple-bit and single bit inputs, using different types of logic and/or comparison techniques for these inputs, are contemplated for various configurations that can be provided by concatenator 191 in order to determine and generate the final output status for product "X" as the output signal provided at output status 193. In addition to providing a simple "good" or "reject" signal at output status 193, concatenator 191 may also be configured to provide a multiple-bit output at output status 193 representative of some value associated with product "X" based on, calculated from, or otherwise associated with the statuses provided by one or any combination of registers 154, 164, 174, through 184 of data sync circuit 151. For example, a multiple-bit output provided at output status 193 for a product may be determined as the lowest value provided as a multiple-bit input to concatenator 191 from registers 154, 164, 174, through 184, a highest value provided by these registers, or a mean, an average, or a weighted average of the values provided by these registers.

In various examples, instead of or in addition to providing a simple status indication of a "good" or "bad" product for product "X," concatenator 191 is operable to provide classification output 195. In various examples, classification output 195 provides a value associated with a classification assigned to product "X" based on one or more statuses assigned to product "X" by registers 154, 164, 174, and 184. In various examples, one of registers 154, 164, 174, and/or 184 provides a status for product "X" associated with a grade or classification for product "X," for example a tolerance requirement to which product "X" complies with, but to different degrees. For example, if product "X" complies to the tolerance requirements within a defined first range, product "X" is determined to be a "grade A" product, but if product "X" is instead outside this first tolerance range, but still falls within a broader tolerance range, product "X" is determined to be a "grade B" product, and if product "X" does not fall within the broader tolerance range, product "X" is considered to be a reject product. In this example, concatenator 191 is configured to provide an output signal on output status 193 if the product is determined to be a reject product, and in the alternative to provide a signal on classification status 195 indicative of whether product "X" is a "grade A" product or a "grade B" product. In various examples, the classification of the product can be used to mark the product for different functions, and/or to be shipped to different customers having different product requirements relative to other customers. In various examples, the different grade products may be redirected so that products indicated with a particular grade, such as "grade B" are to be reworked or otherwise further processed before shipment to customers. A variety of different combinations of classification status outputs from concatenator 191 would be possible, and are contemplated as example configurations for data sync circuit 151.

In various examples, the predetermined location that is associated with providing the status of product "X" is not the actually the reject station, but for example is a position located along the processing line that is downstream from the last process station providing a status for product "X," and is located upstream from the reject station. In some examples, the final output status of product "X" can be determined at the predetermined location and before product "X" arrives at the reject station. In such examples, delay block 192 may be used to register and track the final status and/or any classification status provided by concatenator 191 relative to product "X" from the predetermined location to the reject station as product "X" continues to move through the processing line. In various examples, this tracking from the predetermined location to the reject station may be based on encoder pulses provided by encoder 72, and corresponding to a distance between the location of the predetermined location and the reject station along the processing line. For example, if the predetermined location is 13 centimeters (5 inches) upstream from the reject station along the processing line, and each one of the pulses received by data sync circuit 151 represents a movement of 2.5 centimeters (1 inch) of the mechanism used to move product "X" from the predetermined location to the reject station, delay block 192 may be configured to provide a register having a bit length of five bits. The final status of product "X" is provided to delay block 192 from concatenator 191, and is shifted through the register of delay block 192 based on the encoder pulses so that the final status of product "X" is provided at an output 193D from delay block 192 as product "X" arrives at the reject station. In various examples where concatenator 191 provides product classification signal 195 associated with a product at the predetermined location, delay block 192 may be configured to provide one or more shift registers to receive classification signal output 195 from concatenator 191, and to shift the classification signals through the one or more shift registers to provide the classification signal associated with a given product as output 195D from delay block 192 as the product arrives at the reject station.

By using delay block 192, a predetermined location can be selected at some point downstream from the last process station of a processing line that is coupled to data sync circuit 151 but that is not a same position as the reject station of the processing line. Then, delay block 192 uses a set of registers to track the final status or statuses determined for the product when the product arrives at the predetermined location instead of tracking these statuses all the way to the reject station using registers 154, 164, 174, through 184. This features allows each of registers 154, 164, 174 through 184 to have a length based on the distance from the respective process station to the predetermined location rather than the downstream reject station, thus shorting the required length for each of these registers, and thereby saving memory and register space overall required to track products all the way to the reject station.

In various examples, data sync circuit 151 receives product detected signal 75 from a product detect sensor 76 indicating that a product is present at particular position along the processing line not necessarily associated with one of the process stations located along the processing line. In some examples, product detect sensor 76 is located at the predetermined location described above, or may be located at the reject station. Product detect sensor 76 is not limited to any particular type of sensor, and may be any sensor configured to detect the presence of a product that is being processed by the processing line when the product arrives at the position along the processing line where product detect sensor 76 is located. Data sync circuit 151 is configured to receive product detect signal 75 indicative of the presence or the absence of a product at the location of product detect sensor 76. Based on the tracking of statuses provided by registers 154, 164, 174, through 184, and in some examples delay block 192, data sync circuit 151 is operable to determine, based on pulses received from encoder output signal 73, when a product that was present at the process stations and tracked by these registers should have arrived at the position being monitored by product detect sensor 76. For example, based on the tracking of product "X" through the processing line, data sync circuit 151 is configured to determine that product "X" should have arrived at the reject station of the processing line.

By placing product detect sensor 76 at the reject station, product detect signal 75 can be provided to data sync circuit 151 indicative of whether or not product "X" is actually present at the reject station at a point where the tracking of product "X" indicates product "X" should be at the reject station. If product "X" is not detected (e.g., a positive indication of product being present is not provided by product detect sensor 76 when product "X" is supposed to have arrived at the position being monitored by sensor 76) a product missing output signal 199 can be provided from data sync circuit 151. In various examples, data sync circuit 151 includes product missing detection circuit 198 coupled to receive the output signals from concatenator 191 and/or delay block 192. Product missing detection circuit 198 is also coupled to receive product detect signal 75 indicative of whether a product is actually being sensed by product detect sensor 76. In various examples, product missing detection circuit 198 is operable to compare the tracked status of a product to determine when the product is supposed to have arrived at a given location of the processing line to product detect signal 75 provided by product detect sensor 76, and if the product that is supposed to be present at the position being monitored by product detect sensor 76 is not detected, to output an alarm signal at output 199 indicative of a missing product condition. In some examples, product missing detection circuitry 198 includes counter circuitry configurable to be set to a predetermined number, wherein product missing detection circuit 198 is further configured to provide the alarm signal at output 199 when a number of products determined to be missing in a row, or in the alternative in total number of detected missing products, has exceeded the threshold number set by the counter.

In various examples, each of registers 154, 164, 174, and 184 may be compared to one another by product missing detection circuit 198, as represented by arrow 194, to provide a signal at output 199 indicative of a missing product condition when a product that was detected at any one of the process stations being tracked by the registers is not also and/or subsequently detected at one or more of the other process stations. For example, once product "X" is detected at the process station providing set of signal 102, a status assigned to product "X" can be tracked so that, based on a predetermined number of encoder pulses received at data sync circuit 151 from encoder 72, product "X" should have arrived at the downstream process station providing the set of signals 104. If product "X" is not detected at this downstream process station based on a status or statuses being tracked by the registers, product missing detection circuit 198 can be configured to provide a signal indicative of a missing product condition at output 199. In some examples, output 199 signal indicative of a missing product condition includes information or data, such as a number output, indicative of the process station where the missing product was detected. Detection of a missing product condition is not limited to detection of a product that is missing from a process stations that is downstream from a process station where that product was previously detected. For example, a missing product condition can be detected by product missing detection circuit 198 in circumstances where a product is first detected at one of the downstream process stations but that same product, based on the tracking of products using the registers of data sync circuit 151, was not determined to be present at one or more upstream process stations. In other words, a product can generate a missing product condition by "appearing" as a downstream process station when the product was not also detected at one or more upstream process stations.

Detection of missing product may occur for several reasons, including that products are actually moved from their expected position, and/or removed from the processing line, for example having fallen off the processing line, or for example because product detection sensors at one or more of the process stations is/are not operating properly to detect products. Regardless, the signal provided at output 199 indicative of a missing product condition can be used for a variety of additional purposes, such as to provide an alert using visual and/or audio alarms, or to initiate other actions, such as stopping the further processing of products at one or more process stations and/or shutting down the mechanism providing the movement of products through the processing line, until the missing product condition has somehow been acknowledged and/or reset. In various examples, output 199 is coupled to provide the alarm signal to other devices (not shown in FIG. 4) that may for example control operation of the mechanism and/or the process stations associated with the processing line being monitored by data sync circuit 151.

In the above description related to registers 154, 164, 174, and 184, reference has been made to assigning, registering, and to tracking a status or statuses associated with a product "X". As illustrated in FIG. 4, additional products, such as illustrative products "Y" and "Z" may follow product "X" in the flow of products being moved through the processing line. As with product "X," each of products "Y" and "Z" may also be processed and have a status or statuses assigned to these products by the process stations coupled to and providing sets of signals 102, 104, through 110. As illustrated in FIG. 4, these statuses for products "Y" and "Z" are also registered and tracked by registers 154, 164, 174, and 184. As the status or statuses registered for each of these products individually arrive at the bit positions aligned by dashed line 190, these status or statuses for that product will be provided to concatenator 191, and processed to provide one or more final status outputs and/or classification output signals as described above with respect to product "X".

Further, more than one product may arrive at a given process station for processing at a same time. For example, two products arranged side by side may arrive at a process station for inspection within the processing zone of the process station at a same time. In various examples, individual cameras may be arranged to inspect each product separately from the other product. As such, each camera can be coupled to a different one of port 152, 162, through 182, and having the registers coupled to these different ports configured to have a same bit length as the other register because these two products are both positioned at a same distance from the predetermined location at any given time. Each register would be configured to track a status assigned to the product the was processed by the camera coupled to the port and to that register independently and separately from the status assigned to the other product being processed at the same time at that process station. It would be understood that the number of parts that could be provided to and processed at a given process station at substantially a same time is not limited to any particular number of products, and that registration and tracking of statuses for multiple products being processed at a given process station at substantially a same time could be accomplished by the data sync circuit 151 as described above.

Thus, data sync circuit 151 is configured to track a series of products flowing through a processing line, and to track one or more statuses assigned to each of these product by one, some, or all of a set of process stations that are processing the products as the products move through the processing line. Configuration of data sync circuit 151 to properly track all of these statuses to a predetermined location along the processing line can be simply done based on configuring a series of register lengths, as described herein, corresponding to distances between each of the process stations and the predetermined location. Data sync circuit 151 may be configured to provide an output status or output statuses for products arriving at the predetermined location, or at a further downstream position along the processing line tracked from the predetermined location, such as to a reject station. These output signals corresponding to product status or statuses may be used at the predetermined location for further processing, and/or to redirect products based on the tracked status or statuses for each product as that product arrives at the predetermined location. In addition, data sync circuit 151 may be configured to provide detection of missing products, and may be configured to provide an alarm output when a missing product condition is detected related to the flow of products through the processing line.

In various examples, the configurable features, such as setting for the bit lengths of each of registers 154, 164, 174, through 184 of data sync circuit 151 may be entered manually, or may be auto-configured. Manual entry of the setting for the bit lengths of these registers may be done by a programming device (not shown in FIG. 4) coupled to data sync circuit 151, or by a set of input devices, such as switches and/or rotary control inputs, or other input devices, such as keypad inputs provided on a device (not shown in FIG. 4) in which data sync circuit 151 is installed into or incorporated within. In various examples, an auto-calibration procedure can be used to set the bit lengths for each of registers 154, 164, 174, through 184 of data sync circuit 151. In various examples, data sync circuit 151 is placed in a calibration mode, and a calibration product that is detectable at each of the process stations coupled to the ports of data sync circuit 151 is passed along the processing line in the normal and same manner as the products to be tracked would be moved through the processing line. As the calibration product arrives at each process station along the processing line, that process station provides a "part present" signal on the TRIGGER line of the port coupled to the process station providing the product present signal. The number of encoder pulses received from encoder 72 is then counted by data sync circuit 151 from the time the product present single is received until the product arrives at and is detected at the predetermined location. Once the number of encoder pulses received during the time the calibration product travels from the process station to the predetermined location is known, a bit length for the register associated with the port that provided the "part present" signal is determined based on this determined number of encoder pulses.

For each port, as the "part present" signal from the process station coupled to that port indicating the arrival of the calibration product at that process station is received, encoder pulses are tracked until the calibration product arrives at and is detected at the predetermined location. Based on these encoder pulse counts, a bit length for the registers associated with each port is determined and set for that register. In addition, encoder pules can also be tracked from a time the calibration product is detected at the predetermined location to the time the calibration product arrives at and is detected at the downstream location, such as a reject station, in order to determine and set a length for a register or a set of registers provided by delay block 192 used for tracking a status or statuses of products from the predetermined location to the actual reject station. In this manner, one or more tracking configurations for data sync circuit 151 can be set by the process on passing a calibration product through the processing line, and tracking encoder pulses received by data sync circuit 151 as the calibration product moves through the processing line.

In various examples, data sync circuit 151 does not comprise a microprocessor, and does not required the use of a microprocessor in order to provide the features described above. In various examples, data sync circuit 151 comprises a programmable hardware device, such as a generic array logic ("GAL") device. As such, configuration of data sync circuit 151, including for example configuration and reconfiguration of the lengths of the registers provided in data sync circuit 151 for tracking the statuses of products, is simplified comparted to the processes required to program and reprogram a microprocessor to perform these same functions.

Figure 5A:
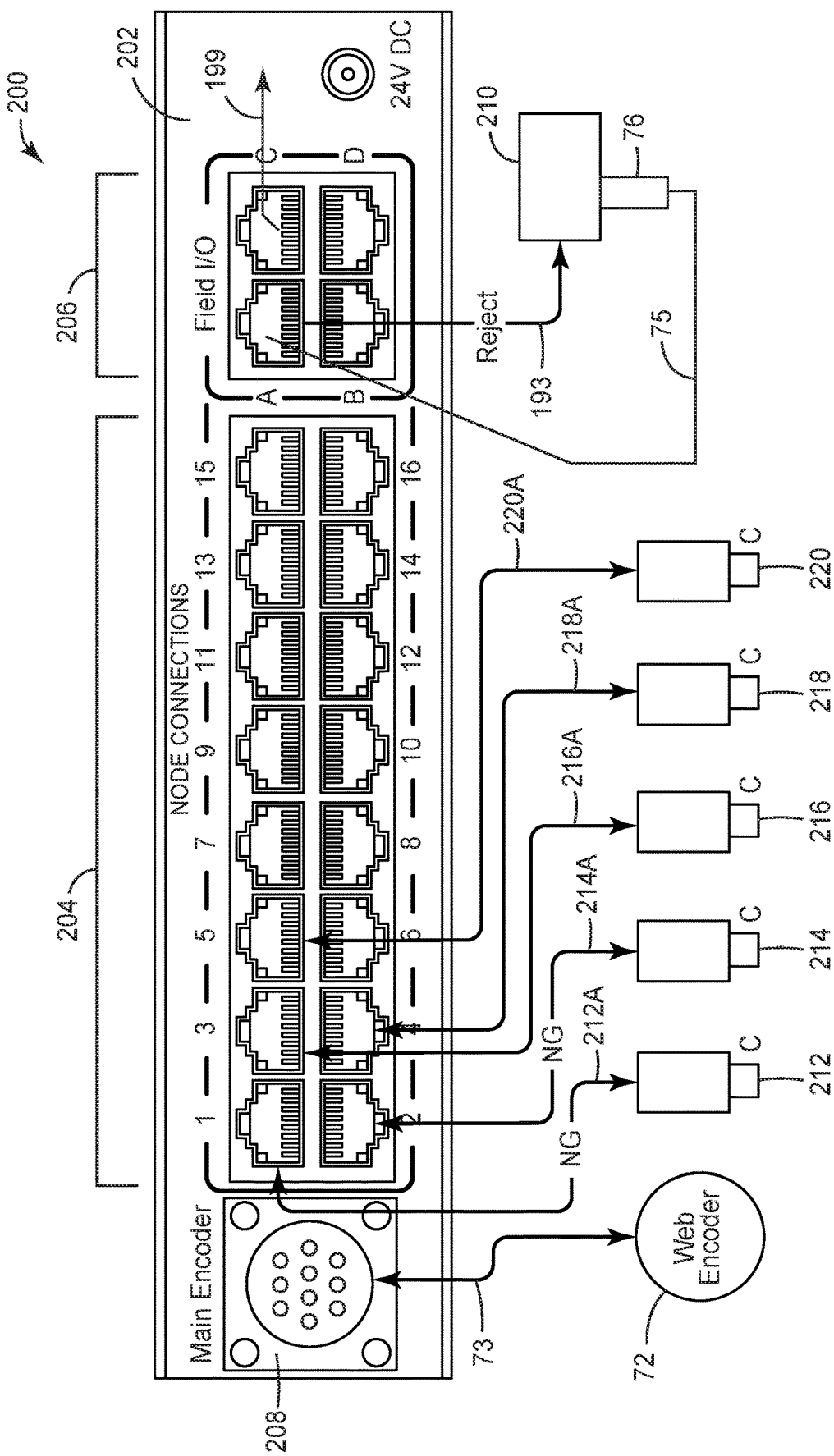
FIG. 5A is a layout diagram illustrating a rear panel and a plurality of connections for a product status synchronization device in accordance with one or more examples described in this disclosure.

FIG. 5A is a layout diagram illustrating rear panel 202 and a plurality of connections 204, 206, 208 for a product status synchronization device 200 in accordance with one or more examples described in this disclosure. As shown, rear panel 202 comprises a plurality of node connections 204. Node connectors 204 as illustrated include sixteen separate node connectors, 1-16, but examples of rear panel 202 are not limited to comprising sixteen node connectors, and in various examples include more or less than sixteen node connectors. In various examples, each node connection 204 comprises multiple connector pins. In various examples, each node connection of node connections 204 is configured to be coupled to one process station of a processing line being monitored by product status synchronization device 200.

For the purposes of illustration, example process station 212 includes a machine vision camera, and is communicatively coupled to node connection 1 of rear panel 202 through connection 212A. Similarly, example process station 214 includes a machine vision camera communicatively coupled to node connection 2 of rear panel 202 through connection 214A, example process station 216 includes a machine vision camera communicatively coupled to node connection 3 of rear panel 202 through connection 216A, example process station 218 includes a machine vision camera communicatively coupled to node connection 4 of rear panel 202 through connection 218A, and example process station 220 includes a machine vision camera communicatively coupled to node connection 5 of rear panel 202 through connection 220A. As such, process stations 212, 214, 216, 218, and 220 are illustrative of a series of process stations, such as process stations 60-64 as shown in FIG. 2, providing processing of products and generating signals regarding the status of these products, for example as illustrated in FIG. 3, that are provided to a data sync circuit, such as data sync circuit 74 shown in FIG. 3 and data sync circuit 151 shown in FIG. 4, to provide a status output signal indicative of the status of a product moving through a processing line. In various examples, each of node connections 204 is separately and individually coupled to a port, such as ports 152, 162, 172, 182 shown in FIG. 4, wherein a status provided as an input signal to these ports is registered into individual registers 154, 164, 174, 184, respectively, coupled to these ports.

Rear panel 202 comprises connector 208 configured to be coupled to an encoder, such as illustrative encoder 72 through connection 208, as illustrated in FIGS. 2 and 4, and to receive an encoder output signal generated by encoder 72 indicative of movement of the mechanism (such as mechanism 52 shown in FIG. 2) that is configured to move products through the processing line where process stations 212, 214, 216, 218, and 220 are located. Based on the received encoder output signal, product status synchronization device 200 is configured to track a status of one or more product that are processed by one or more of process stations 212, 214, 216, 218, and 220, and to provide status output signal 193 to one of connections 206 located on rear panel 202. In various examples, output signal 193 is coupled to reject station 210, such as reject station 80 shown in FIG. 2, wherein reject station 210 is configured to receive a status output signal provided by connection 206 through connection 193, and to provide further processing, or to redirect the product that is present at the reject station 210, based on the status output signal provided by connection 206. In various examples, connection 206 includes an input provided to receive a product detect signal, such as the product detect signal 75 provided by product detect sensor 76 shown in FIG. 2. In various examples, product status synchronization device 200 is configured to receive product detect signal 75, to determine if a part should be present at the reject station 210, as described above, and to generate a signal at output 199 indicative of a missing part condition, as described above, when a part should be present but no part is being detected at reject station 210.

Figure 5B:
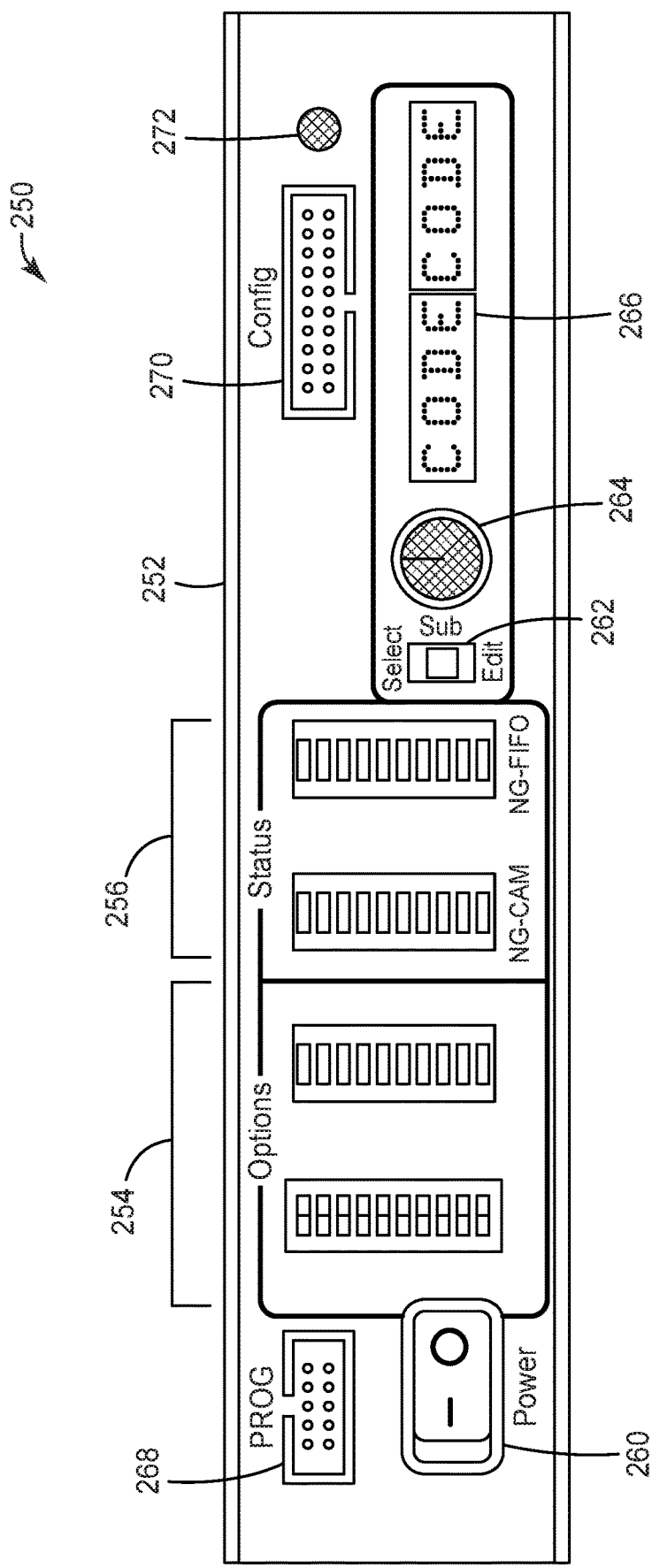
FIG. 5B is a layout diagram illustrating a front panel for a product status synchronization device in accordance with one or more examples described in this disclosure.

FIG. 5B is a layout diagram illustrating front panel 252 of product status synchronization device 200 in accordance with one or more examples described in this disclosure. As illustrated, front panel 252 comprises power switch 260, OFF/ON indicator lamp 272, set of switches and indicators 254, set of status indicators 256, programming connector 268, configuration connector 270, select/edit switch 262, rotary control input 264, and visual alpha-numeric display 266. Power switch 260 is used to turn power to product status synchronization device 200 on and off, and status indicator lamp 272 may be illuminated to indicate when the product status synchronization device 200 has been turned on and is powered.

The set of switches and indicators 254 in various examples is used to provide operator inputs to product status synchronization device 200, and to provide visual status indications related to the status of one or more aspects of product status synchronization device 200. In various examples, status indicators 256 provide visual indicators related to the status signals being received as the NG OUT signals from process stations coupled to product status synchronization device 200, for example as illustrated with respect to devices coupled to the node connections 204 as illustrated in FIG. 5A. Referring again to FIG. 5B, configuration connector 270 can be used to couple the product status synchronization device 200 to a device (not shown in FIG. 5B) that allows a user to configure various aspects of the product status synchronization device 200. In some examples, configuration connector 270 allows a device coupled to connector 270 to provide configuration settings, including register lengths, for setting the bit lengths for the registers used to track statuses for products moving through a processing line that product status synchronization device 200 is coupled to, such as the bit lengths for registers 154, 164, 174, through 184 and registers provided with delay bock 192 as shown in FIG. 4.

Referring again to FIG. 5B, in various examples select/edit switch 262, rotary control input 264, and visual alpha-numeric display 266 may be used in combination to configure aspects of product status synchronization device 200, including but not limited to setting the bit lengths for the registers used by product status synchronization device 200 to track the statuses of product moving through a processing line as described above. For example, using select/edit switch 262, the switch may be actuated to the "edit" position, and rotary control input 264 actuated (rotated) until alpha-numeric display 266 indicates that the bit length for the registers used for tracking product statuses for the process station coupled to the first node input of product status synchronization device 200 is chosen for editing. The select/edit switch is then actuated to be in the "select" position, and rotary control input 264 is again actuated (rotated) until alpha-numeric display 266 indicates a number representative of the desired number of bits (register length) for the register used to track the status of product being processed by the process station associated with that register. This register length can then be set by again moving select/edit switch 262 to the "edit" position. This process may be repeated in order to set the register lengths for one, some, or all of the registers that are intended to be used to track statuses of products moving through the processing line being monitored by product status synchronization device 200.

Figure 6:
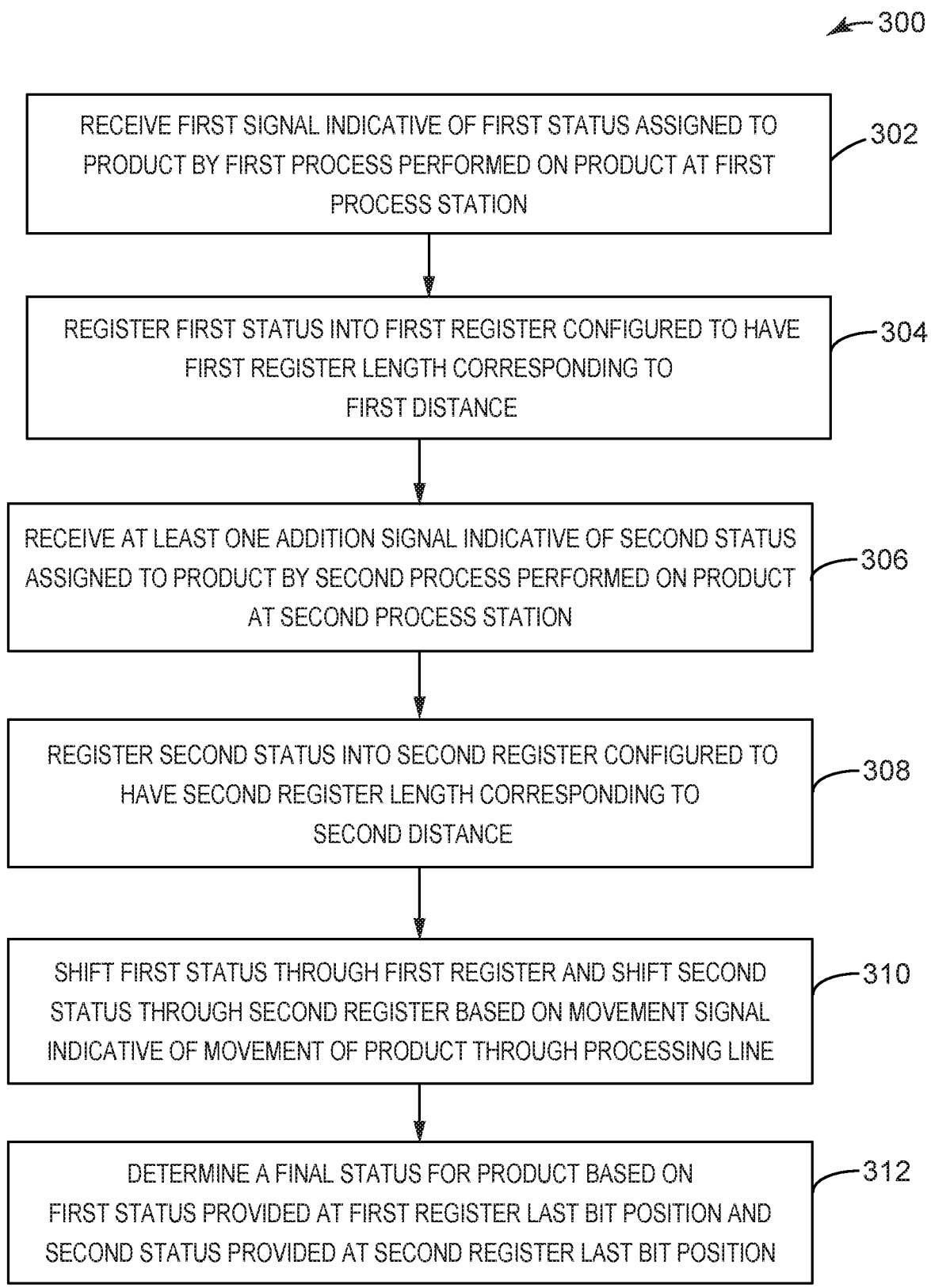
FIG. 6 is a flowchart illustrating one or more example methods in accordance with various techniques described in this disclosure.

FIG. 6 is a flowchart illustrating various example methods 300 that may be performed by a product status synchronization device, in accordance with the techniques described in this disclosure. Although discussed with respect to product status synchronization device 70 as illustrated and described with respect to FIG. 2 and FIG. 3, example methods 300 are not limited to the example implementations illustrated with respect to product status synchronization device 70 and FIG. 2 or FIG. 3. The techniques of example methods 300 can be implemented, in whole or in part, by product status synchronization devices 20A-20N as shown in FIG. 1, by data sync circuit 74 as shown in FIG. 2 and FIG. 3, by data sync circuit 151 shown in FIG. 4, or by device 200 shown in FIG. 5A and FIG. 5B.

As illustrated in FIG. 6, product status synchronization device 70 is configured to receive, at a product status synchronization device, a first signal indicative of a first status assigned to a product by a first process performed on the product at a first process station, the first process station located at a first distance from a predetermined location along a processing line (block 302). Product status synchronization device 70 is further configured to register the first status into a first register included in the product status synchronization device, the first register configured to have a first register length corresponding to the first distance and a having a first register last bit position (block 304). Product status synchronization device 70 is further configured to receive at least one addition signal indicative of a second status assigned to the product by a second process performed on the product at a second process station, the second process station located at a second distance from a predetermined location along a processing line, and wherein the second distance is different from the first distance (block 306).

In various examples, product status synchronization device 70 is further configured to register the second status into a second register included in the product status synchronization device, the second register configured to have a second register length corresponding to the second distance and a having a second register last bit position (block 308). Product status synchronization device 70 is further configured to shift the first status through the first register and to shift the second status through the second register based on a movement signal indicative of movement of the product through the processing line so that the first status is shifted into the first register last bit position and the second status is shifted into the second register last bit position when the product arrives at the predetermined location (block 310). In various examples, the first register and the second register are provided as a generic array logic ("GAL") device. Product status synchronization device 70 is further configured to determine a final status for the product based on the first status provided at the first register last bit position and the second status provided at the second register last bit position (block 312).

In various examples of methods 300, at least one of the first process or the second process comprises an inspection process of the product, and wherein at least one of the first signal or the second signal includes a signal indicative of a status for the product determined as a result of the inspection process. In various examples of methods 300, product status synchronization device 70 is configured to receive a product detect signal indicating that the product is not being detected at the predetermined location, to determine, based on a movement signal indicative of movement of the product through the processing line that the product should have arrived at the predetermined location, to generate a missing product detected signal indicating that the product is not being detected at the predetermined location and should have arrived at the predetermined location, and to output the missing product detected signal. In various examples of methods 300, product status synchronization device 70 is configured to output a status signal to a reject station located at the predetermined location, the status signal including an indication of the final status for the product located at the reject station.

Figure 7:
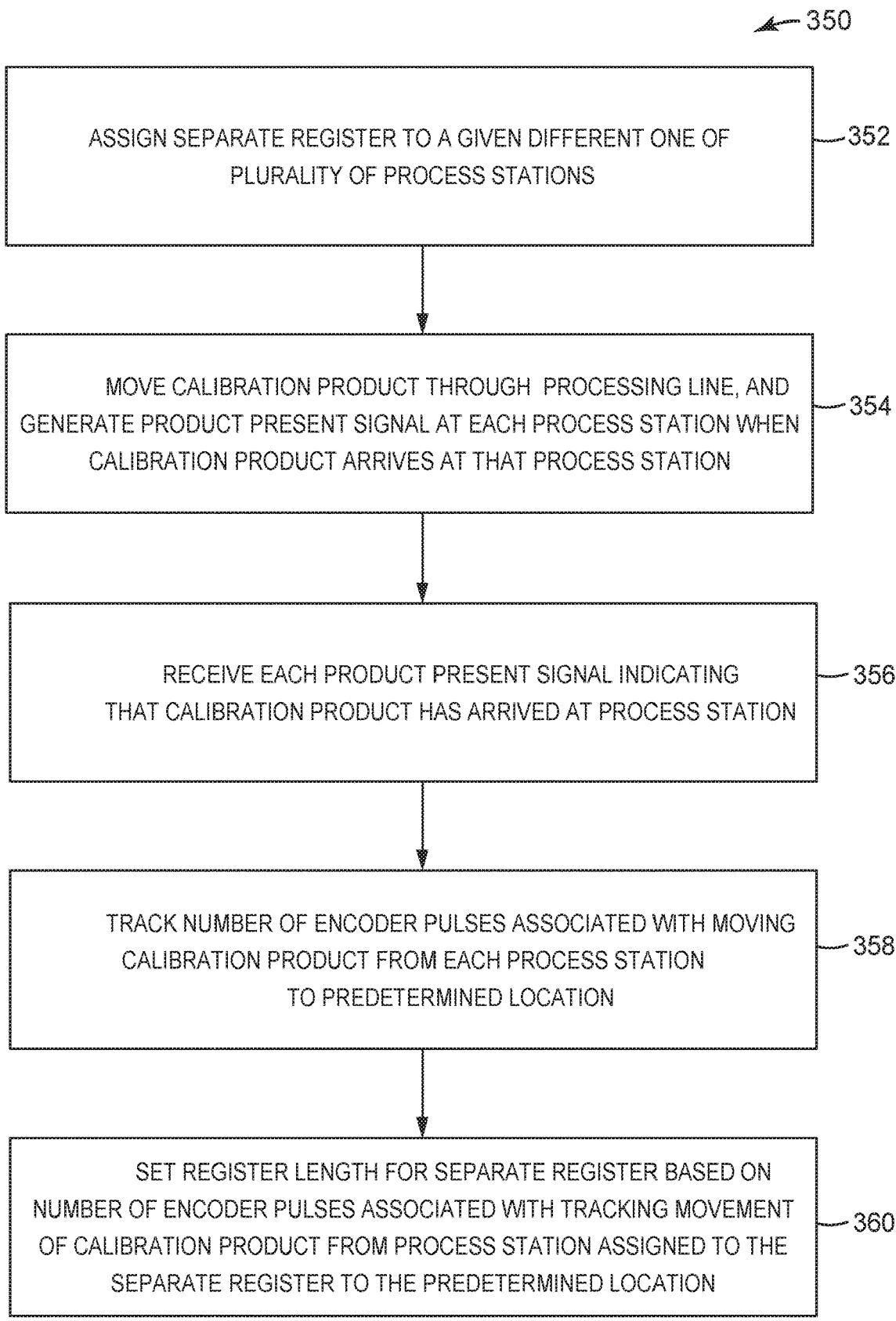
FIG. 7 is a flowchart illustrating one or more example methods in accordance with various techniques described in this disclosure.

FIG. 7 is a flowchart illustrating various example methods 350 that may be performed by a product status synchronization device coupled to a process line in accordance with the techniques described in this disclosure. Although discussed with respect to product status synchronization device 70 and process line 50 as illustrated and described with respect to FIG. 2, example methods 350 are not limited to the example implementations illustrated with respect to product status synchronization device 70 and processing line 50 shown in FIG. 2. The techniques of example methods 350 can be implemented, in whole or in part, by processing lines 7A-7N as shown in FIG. 1, by data sync circuit 74 as shown in FIG. 2 and FIG. 3, by data sync circuit 151 shown in FIG. 4, or by device 200 shown in FIG. 5A and FIG. 5B.

In various examples, product status synchronization device 70 is configured to assign a separate register of a plurality of registers provided within a product status synchronization device to a given and different one of a plurality of process stations provided at different positions along the processing line (block 352). Processing line 50 is further configured to move a calibration product through the processing line, and to generate a product present signal at each process station when the calibration product arrives at that process station (block 354). Processing line 50 is further configured to receive, at product status synchronization device 70, each of the product present signals indicating that the calibration product has arrived at each of the process stations (block 356). Processing line 50 is further configured to track, by the product status synchronization device 70, a number of encoder pulses associated with moving the calibration product from each of the plurality of process stations to a predetermined location along the processing line (block 358). Product status synchronization device 70 is further configured to, for each of the separate registers, set a register length for the separate register based on the number of encoder pulses associated with tracking the moving of the calibration product from the process station assigned to the separate register to the predetermined location (block 360). In various examples, product status synchronization device 70 is further configured to align the separate registers so that a final bit of each of the plurality of registers corresponds with the arrival of the calibration product at the predetermined location.

The techniques of this disclosure may be implemented in a wide variety of computing devices, image capturing devices, and various combinations thereof. Any of the described units, modules or components may be implemented together or separately as discrete but interoperable logic devices. Depiction of different features as modules, devices, or units is intended to highlight different functional aspects and does not necessarily imply that such modules, devices, or units must be realized by separate hardware or software components. Rather, functionality associated with one or more modules, devices, or units may be performed by separate hardware or software components, or integrated within common or separate hardware or software components. The techniques described in this disclosure may be implemented, at least in part, in hardware, software, firmware or any combination thereof. For example, various aspects of the techniques may be implemented within one or more microprocessors, digital signal processors ("DSPs"), application specific integrated circuits ("ASICs"), field programmable gate arrays ("FPGAs"), programmable logic devices ("PLD"), programmable array logic ("PAL") devices, generic array logic ("GAL") devices, or any other equivalent integrated or discrete logic circuitry, as well as any combinations of such components. The terms "processor," "processing circuitry," "controller" or "control module" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as random access memory ("RAM"), read-only memory ("ROM"), non-volatile random access memory ("NVRAM"), electrically erasable programmable read-only memory ("EEPROM"), FLASH memory, magnetic media, optical media, or the like that is tangible. The computer-readable storage media may be referred to as non-transitory. A server, client computing device, or any other computing device may also contain a more portable removable memory type to enable easy data transfer or offline data analysis. The instructions may be executed to support one or more aspects of the functionality described in this disclosure. In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

What is claimed is:

1. A device comprising:
a product status synchronization device comprising a plurality of input ports and an encoder input, each of the plurality of input ports coupled to one of a plurality of registers and configured to receive a signal indicative of a status assigned to a product by one of a plurality of process stations, and to register the status assigned to the product into the one of the plurality of registers coupled to each input port, wherein one or more of the plurality of process stations are located at different distances from a predetermined location along a processing line and are configured to asynchronously process one or more products moving through the processing line,
wherein each of the plurality of registers is coupled to a different one of the plurality of input ports and has a register length, wherein the register length for each register is configured to have a length corresponding to a distance between the one of the plurality of process stations that is configured to be coupled to the each input port coupled to the each register and the predetermined location along the processing line, each register configured to track a plurality of statuses that have been registered into the each register by the each input port coupled to the each register,
wherein the encoder input is configured to receive a movement signal indicative of movement of the one or more products through the processing line, and to shift the plurality of statuses registered in each of the plurality of registers based on the movement signal
wherein each of the plurality of registers comprises a final bit position and the final bit position of each of the plurality of registers aligns with the final bit position of every other one of the final bit positions, and
wherein the product status synchronization device product status is configured to determine a final status for a product that has arrived at the predetermined location based on a plurality of statuses indicated for the product at each of the final bit positions.

2. The device of claim 1, wherein the final status of the product is determined by performing a logical "OR" function using the plurality of statuses provided at each of the final bit positions for the product as inputs to the logical "OR" function.

3. The device of claim 1, wherein the final status of the product is determined based at least in part on a multiple-bit value provided as one of the plurality of statuses for the product by at least one of the final bit positions.

4. The device of claim 1, the product status synchronization device further comprising:
a status output configured to provide a status output signal indicative of a status associated with a given one of the one or more products, the status based on a combination of statuses provided by the plurality of registers for the given one of the one or more products, the status output signal indicative of the status associated with the given one of the one or more products configured to be provided as the given one of the one or more products arrives at the predetermined location of the processing line.

5. The device of claim 1, wherein the plurality of registers comprises a plurality of first-in-first-out ("FIFO") registers.

6. The device of claim 1, wherein the synchronization device comprises a generic array logic ("GAL") device.

7. The device of claim 1,
- wherein each of the plurality of registers comprises a final bit position and the final bit position of each of the plurality of registers aligns with the final bit position of every other one of final bit positions, and
- wherein a given input port that is coupled to a given register of the plurality of registers is configured to register a sequence of statuses into the given register based on a sequence of statuses received at the input port coupled to the given register, and
- wherein the given register is configured to shift the sequence of statuses through the given register based on the movement signal, and to provide a given status of the sequence of statuses at the final bit position of the given register when a product of the one or more products that has been assigned the given status has arrived at the predetermined location.

8. The device of claim 1, the product status synchronization device further comprising:
- a plurality of windows, each of the plurality of windows separately and individually coupled to one of the plurality of registers,
- wherein each of the windows is configured to group a plurality of last bits of the register coupled to that window, and to provide an output status based on a status provided by one or more of the plurality of last bits of the register grouped by the window coupled to the register.

9. The device of claim 1, wherein the registers are configured to be shifted based on the receipt of encoder pulses corresponding to a movement of the mechanism configured to move the one or more products through the processing line.

10. The device of claim 1, wherein the status of a product is a status assigned to the product as a result of an inspection performed on the product by a machine vision system.

11. The device of claim 1, wherein the product status synchronization device further comprises a product detect input and a product missing product detected output, the product detect input configured to receive an input signal indicative of the presence of a product at the predetermined location,
- the product status synchronization device further configured to determine, based on the status provided by one or more of the plurality of registers, that a product should be present at the predetermined location, and to provide an output signal at the missing product detected output when a determination has been made that a product should be present at the predetermined location and the product detect input is not providing the input signal indicative of the presence of the product at the predetermined location.

12. The device of claim 1, the product status synchronization device further comprising:
- a delay block comprising an additional register, the additional register configured to register a final status determined for a product arriving at the predetermined location,
- wherein the product status synchronization device is configured to determine the final status for a product that has arrived at the predetermined location based on a status determined for the product based on a plurality of statuses assigned to the product and registered into the plurality of registers,
- the delay block configured to shift the final status assigned to the product through the additional register based on the movement signal,
- the additional register configured to have an additional register length that corresponds to a distance along the processing line between the predetermined location and a reject station located along the processing line,
- the delay block further configured to provide the final status of the product as a status output signal when the product arrives at the reject station.

* * * * *